US012640971B2

(12) United States Patent
Ali et al.

(10) Patent No.: US 12,640,971 B2
(45) Date of Patent: May 26, 2026

(54) CONFIGURING A REFERENCE SIGNAL CORRESPONDING TO A WAVEFORM TYPE

(71) Applicant: Lenovo (Singapore) Pte. Ltd., New Tech Park (SG)

(72) Inventors: Ali Ramadan Ali, Kraiburg am Inn (DE); Ankit Bhamri, Rödermark (DE); Sher Ali Cheema, Ilmenau (DE); Karthikeyan Ganesan, Kronberg im Taunus (DE); Robin Thomas, Bad Nauheim (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 309 days.

(21) Appl. No.: 18/550,204

(22) PCT Filed: Mar. 9, 2022

(86) PCT No.: PCT/IB2022/052125
§ 371 (c)(1),
(2) Date: Sep. 12, 2023

(87) PCT Pub. No.: WO2022/190015
PCT Pub. Date: Sep. 15, 2022

(65) Prior Publication Data
US 2024/0163149 A1     May 16, 2024

Related U.S. Application Data

(60) Provisional application No. 63/160,176, filed on Mar. 12, 2021.

(51) Int. Cl.
*H04L 27/26* (2006.01)
*H04L 5/00* (2006.01)

(52) U.S. Cl.
CPC .......... *H04L 27/261* (2013.01); *H04L 5/0048* (2013.01); *H04L 5/0094* (2013.01)

(58) Field of Classification Search
CPC .... H04L 27/261; H04L 5/0048; H04L 5/0094
See application file for complete search history.

(56) References Cited

U.S. PATENT DOCUMENTS

| 2019/0053235 A1* | 2/2019 | Novlan | H04L 7/0008 |
| 2019/0222399 A1 | 7/2019 | Huang et al. | |
| 2021/0044372 A1 | 2/2021 | Yang et al. | |

FOREIGN PATENT DOCUMENTS

| CN | 112075047 A | * | 12/2020 | H04W 72/23 |
| CN | 112491523 A | * | 3/2021 | H04L 5/0048 |

(Continued)

OTHER PUBLICATIONS

PCT/IB2022/052125, "International Search Report and the Written Opinion of the International Searching Authority, or the Declaration", International Searching Authority, Jun. 13, 2022, pp. 1-14.

(Continued)

*Primary Examiner* — Duc C Ho
(74) *Attorney, Agent, or Firm* — Kunzler Needham Hilton

(57) ABSTRACT

Apparatuses, methods, and systems are disclosed for configuring a reference signal corresponding to a waveform type. One method includes receiving, at a user equipment from a network device, first configuration information indicating a first physical channel with a first waveform type. The method includes receiving, from a network device, second configuration information indicating a first reference signal with the first waveform type. The method includes determining whether a frequency domain multiplexing pattern with combs, frequency domain orthogonal cover code, or a combination thereof is supported for transmission of the first reference signal with the first waveform type.

19 Claims, 24 Drawing Sheets

(56) References Cited

FOREIGN PATENT DOCUMENTS

| | | | | |
|---|---|---|---|---|
| DE | 112017003035 T5 * | 3/2019 | ........... | H04L 5/0051 |
| WO | WO-2019074261 A1 * | 4/2019 | .............. | B62M 1/12 |
| WO | 2019195650 A1 | 10/2019 | | |
| WO | 2020081662 A1 | 4/2020 | | |
| WO | 2020146638 A1 | 7/2020 | | |

OTHER PUBLICATIONS

CATT, "On DMRS design for UL", 3GPP TSG RAN WG1 Meeting #90 R1-1712384, Aug. 21-25, 2017, pp. 1-5.

3GPP, "3rd Generation Partnership Project; Technical Specification Group Radio Access Network; NR; Physical channels and modulation (Release 16)", 3GPP TS 38.211 V16.4.0, Dec. 2020, pp. 1-133.

3GPP, "3rd Generation Partnership Project; Technical Specification Group Radio Access Network; NR; Multiplexing and channel coding (Release 16)", 3GPP TS 38.212 V16.4.0, Dec. 2020, pp. 1-152.

3GPP, "3rd Generation Partnership Project; Technical Specification Group Radio Access Network; NR; Physical layer procedures for control (Release 16)", 3GPP TS 38.213 V16.4.0, Dec. 2020, pp. 1-181.

3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.

* cited by examiner

200

400

```
DMRS-DownlinkConfig ::=              SEQUENCE {
    dmrs-Type                     ENUMERATED {type2}          OPTIONAL,    --Need R
    dmrs-AdditionalPosition       ENUMERATED {pos0, pos1, pos3}  OPTIONAL,    --Need R
    dmrs-group1                   BIT STRING (SIZE (12))      OPTIONAL,    --Need R
    dmrs-group2                   BIT STRING (SIZE (12))      OPTIONAL,    --Need R
    maxLength                     ENUMERATED {len2}           OPTIONAL,    --Need R
    scramblingID0                     INTEGER (0..65535)      OPTIONAL,    --Need S
    scramblingID1                     INTEGER (0..65535)      OPTIONAL,    --Need S
    phaseTrackingRS               SetupRelease {PTRS-DownlinkConfig}OPTIONAL, --Need M
    ...
}
```

```
-- ASN1START
-- TAG-SC-DMRS-DOWNLINKCONFIG-START

SC-DMRS-DownlinkConfig ::=            SEQUENCE {
    dmrs-AdditionalPosition            ENUMERATED {pos0, pos1, pos3}
OPTIONAL,    -- Need S
    maxLength                          ENUMERATED {lenN}
OPTIONAL,    -- Need S
    scramblingID                       INTEGER (0..65535)
OPTIONAL,    -- Need S
}

-- TAG-SC-DMRS-DOWNLINKCONFIG-STOP
-- ASN1STOP
```

FIG. 5

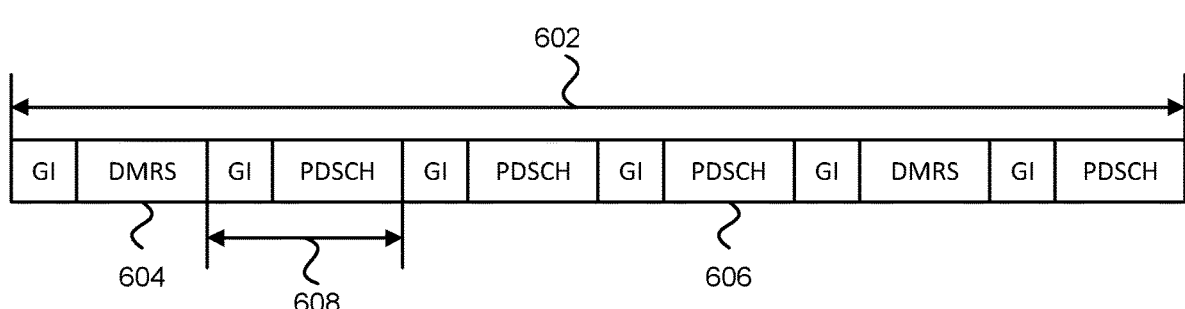
FIG. 6

700

704

702

800

900

```
-- ASN1START
-- TAG-DMRS-UPLINKCONFIG-START

DMRS-UplinkConfig ::=        SEQUENCE {
   dmrs-Type                ENUMERATED {type2}                    OPTIONAL,    -- Need S
   dmrs-AdditionalPosition     ENUMERATED {pos0, pos1, pos3}   OPTIONAL,   -- Need R
   phaseTrackingRS             SetupRelease { PTRS-UplinkConfig }   OPTIONAL,   -- Need M
   maxLength                ENUMERATED {len2}                     OPTIONAL,   -- Need S
   transformPrecodingDisabled            SEQUENCE {     scramblingID0
INTEGER (0..65535)                         OPTIONAL,   -- Need S
      scramblingID1          INTEGER (0..65535)     OPTIONAL,   -- Need S    ...
   }                                          OPTIONAL,   -- Need R
   transformPrecodingEnabled             SEQUENCE {   nPUSCH-Identity
INTEGER(0..1007)                           OPTIONAL,   -- Need S
      sequenceGroupHopping      ENUMERATED {disabled}
OPTIONAL,   -- Need S
      sequenceHopping        ENUMERATED {enabled}                          OPTIONAL, --
Need S
      ...
   }                                    OPTIONAL,   -- Need R
   ...
}
-- TAG-DMRS-UPLINKCONFIG-STOP
```

```
CSI-RS-ResourceMapping ::= SEQUENCE {
        frequencyDomainAllocation  CHOICE {
                row1          BIT STRING (SIZE (4)),
                row2          BIT STRING (SIZE (12)),
                row4          BIT STRING (SIZE (3)),
                other         BIT STRING (SIZE (6))
        },
        nrofPorts                            ENUMERATED {p1, p2, p4},
        firstOFDMSymbolInTimeDomain    INTEGER (0..13),
        firstOFDMSymbolInTimeDomain2   INTEGER (2..12), OPTIONAL, -- Need R
        cdm-Type                             ENUMERATED {noCDM, cdm2-TD2, cdm4-TD4}
        density CHOICE {
                dot5    ENUMERATED {evenPRBs, oddPRBs},
                one     NULL,
                three   NULL,
                spare   NULL
        },
        freqBand    CSI-FrequencyOccupation,
        . . .
}
```

```
CSI-IM-Resource ::= SEQUENCE {
        csi-IM-ResourceId                       CSI-IM-ResourceId,
        csi-IM-ResourceElementPattern           CHOICE {
                pattern0 SEQUENCE {
                        subcarrierLocation-p0   ENUMERATED { s0, s2, s4, s6, s8, s10 },
                        symbolLocation-p0       INTEGER (0..12)
                },
                pattern1 SEQUENCE {
                        subcarrierLocation-p1   ENUMERATED { s0, s4, s8 },
                        symbolLocation-p1       INTEGER (0..13)
                }
        } OPTIONAL,  -- Need M
        freqBand                                CSI-FrequencyOccupation OPTIONAL,
        periodicityAndOffset                    CSI-ResourcePeriodicityAndOffset OPTIONAL,
        periodicOrSemiPersistent

```
-- ASN1START

NR-DL-PRS-Info-r16 ::= SEQUENCE {
    nr-DL-PRS-ResourceSetList-r16          SEQUENCE (SIZE (1..nrMaxSetsPerTrp-r16)) OF
    NR-DL-PRS-ResourceSet-r16,
    ...
}

NR-DL-PRS-ResourceSet-r16 ::= SEQUENCE {
    nr-DL-PRS-ResourceSetID-r16          NR-DL-PRS-ResourceSetID-r16,
    dl-PRS-Periodicity-and-ResourceSetSlotOffset-r16
                                         NR-DL-PRS-Periodicity-and-ResourceSetSlotOffset-r16,
    dl-PRS-ResourceRepetitionFactor-r16  ENUMERATED {n2, n4, n6, n8, n16, n32, ...}
                                                               OPTIONAL,    -- Need OP
    dl-PRS-ResourceTimeGap-r16           ENUMERATED {s1, s2, s4, s8, s16, s32, ...}
                                                               OPTIONAL,    -- Cond Rep
    dl-PRS-NumSymbols-r16                ENUMERATED {n2, n4, n6, n12, ...},
    dl-PRS-MutingOption1-r16             DL-PRS-MutingOption1-r16    OPTIONAL,    -- Need OP
    dl-PRS-MutingOption2-r16             DL-PRS-MutingOption2-r16    OPTIONAL,    -- Need OP
    dl-PRS-ResourcePower-r16             INTEGER (-60..50),
    dl-PRS-ResourceList-r16              SEQUENCE (SIZE (1..nrMaxResourcesPerSet-r16)) OF
                                                   NR-DL-PRS-Resource-r16,
    ...
}

DL-PRS-MutingOption1-r16 ::= SEQUENCE {
    dl-prs-MutingBitRepetitionFactor-r16
                          ENUMERATED { n1, n2, n4, n8, ... }  OPTIONAL,    -- Need OP
    nr-option1-muting-r16           NR-MutingPattern-r16,
    ...
}
```

FIG. 13A

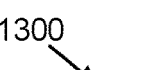

1300

```
DL-PRS-MutingOption2-r16 ::= SEQUENCE {
    nr-option2-muting-r16              NR-MutingPattern-r16,
    ...
}

NR-MutingPattern-r16 ::= CHOICE {
    po2-r16                           BIT STRING (SIZE(2)),
    po4-r16                           BIT STRING (SIZE(4)),
    po6-r16                           BIT STRING (SIZE(6)),
    po8-r16                           BIT STRING (SIZE(8)),
    po16-r16                          BIT STRING (SIZE(16)),
    po32-r16                          BIT STRING (SIZE(32)),
    ...
}

NR-DL-PRS-Resource-r16 ::= SEQUENCE {
    nr-DL-PRS-ResourceID-r16          NR-DL-PRS-ResourceID-r16,
    dl-PRS-SequenceID-r16             INTEGER (0.. 4095),
    dl-PRS-CombSizeN-AndReOffset-r16  CHOICE {
        n2-r16                        INTEGER (0..1),
        n4-r16                        INTEGER (0..3),
        n6-r16                        INTEGER (0..5),
        n12-r16                       INTEGER (0..11),
        ...
    },
    dl-PRS-ResourceSlotOffset-r16     INTEGER (0..nrMaxResourceOffsetValue-1-r16),
    dl-PRS-ResourceSymbolOffset-r16   INTEGER (0..12),
    dl-PRS-QCL-Info-r16               DL-PRS-QCL-Info-r16          OPTIONAL,
    ...
}

DL-PRS-QCL-Info-r16 ::= CHOICE {
    ssb-r16                 SEQUENCE {
        pci-r16                       NR-PhysCellID-r16,
        ssb-Index-r16                 INTEGER (0..63),
        rs-Type-r16                   ENUMERATED {typeC, typeD, typeC-plus-typeD}
    },
    dl-PRS-r16              SEQUENCE {
        qcl-DL-PRS-ResourceID-r16     NR-DL-PRS-ResourceID-r16,
        qcl-DL-PRS-ResourceSetID-r16  NR-DL-PRS-ResourceSetID-r16
    }
}
-- ASN1END
```

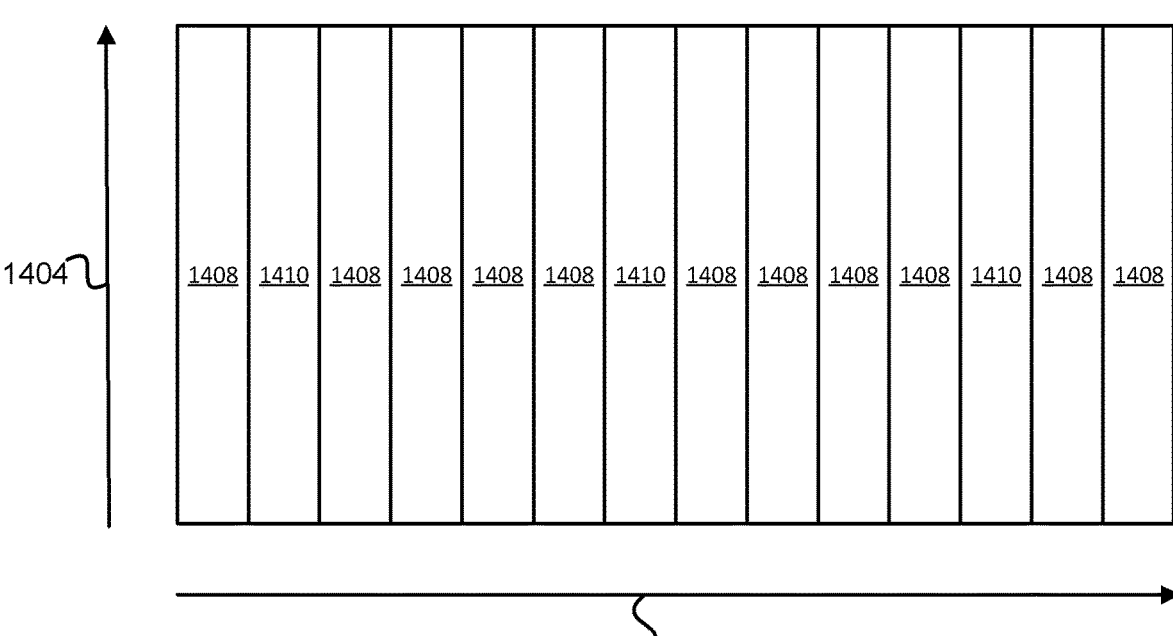
FIG. 14B

1411
1404
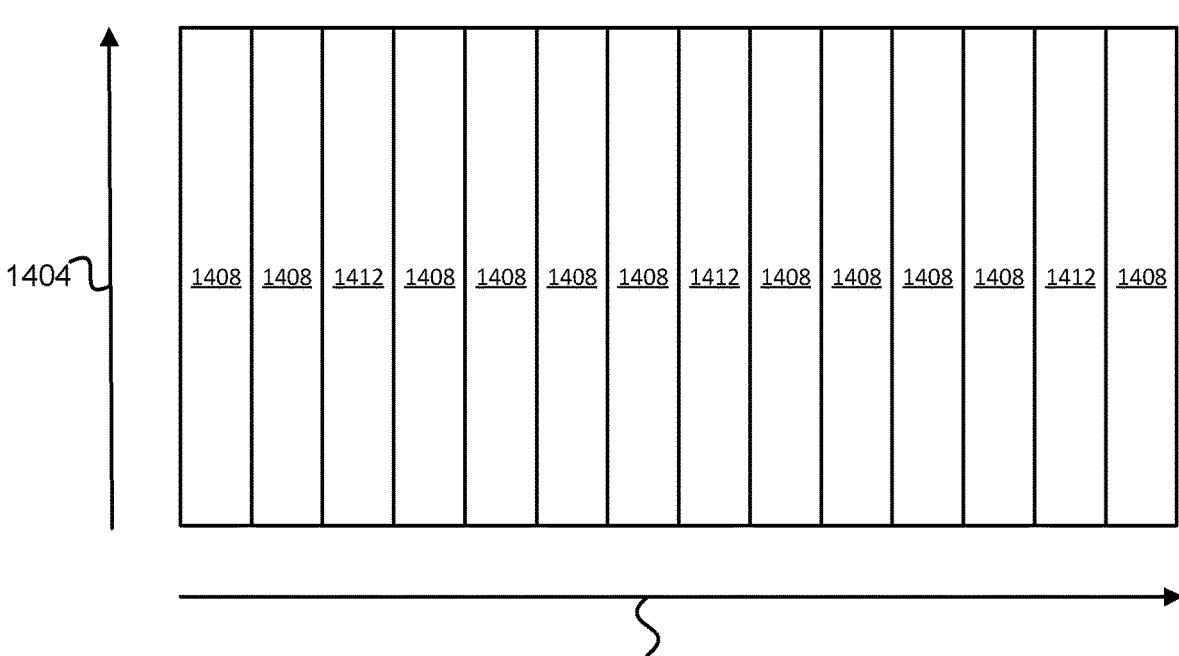
| 1408 | 1408 | 1412 | 1408 | 1408 | 1408 | 1408 | 1412 | 1408 | 1408 | 1408 | 1408 | 1412 | 1408 |
1402
FIG. 14C 1500

```
-- ASN1START
-- TAG-SRS-CONFIG-START
SRS-Config ::=                SEQUENCE {
  srs-ResourceSetToReleaseList      SEQUENCE (SIZE(1..maxNrofSRS-ResourceSets)) OF SRS-
ResourceSetId          OPTIONAL,  -- Need N
  srs-ResourceSetToAddModList        SEQUENCE (SIZE(1..maxNrofSRS-ResourceSets)) OF SRS-
ResourceSet          OPTIONAL,  -- Need N
  srs-ResourceToReleaseList        SEQUENCE (SIZE(1..maxNrofSRS-Resources)) OF SRS-
ResourceId          OPTIONAL,  -- Need N
  srs-ResourceToAddModList        SEQUENCE (SIZE(1..maxNrofSRS-Resources)) OF SRS-
Resource          OPTIONAL,  -- Need N
  tpc-Accumulation            ENUMERATED {disabled}        OPTIONAL,  -- Need S
  ..., [[
  srs-RequestDCI-1-2-r16        INTEGER (1..2)          OPTIONAL, -- Need S
  srs-RequestDCI-0-2-r16        INTEGER (1..2)          OPTIONAL, -- Need S
  srs-ResourceSetToAddModListDCI-0-2-r16  SEQUENCE (SIZE(1..maxNrofSRS-ResourceSets)) OF
SRS-ResourceSet      OPTIONAL, -- Need N
  srs-ResourceSetToReleaseListDCI-0-2-r16 SEQUENCE (SIZE(1..maxNrofSRS-ResourceSets)) OF
SRS-ResourceSetId      OPTIONAL, -- Need N
  srs-PosResourceSetToReleaseList-r16    SEQUENCE (SIZE(1..maxNrofSRS-PosResourceSets-r16))
OF SRS-PosResourceSetId-r16                OPTIONAL, -- Need N
  srs-PosResourceSetToAddModList-r16      SEQUENCE (SIZE(1..maxNrofSRS-PosResourceSets-r16))
OF SRS-PosResourceSet-r16      OPTIONAL,-- Need N
  srs-PosResourceToReleaseList-r16      SEQUENCE (SIZE(1..maxNrofSRS-PosResources-r16)) OF
SRS-PosResourceId-r16        OPTIONAL,-- Need N
  srs-PosResourceToAddModList-r16        SEQUENCE (SIZE(1..maxNrofSRS-PosResources-r16)) OF
SRS-PosResource-r16          OPTIONAL -- Need N
  ]] }
SRS-ResourceSet ::=          SEQUENCE {
  srs-ResourceSetId          SRS-ResourceSetId,
  srs-ResourceIdList          SEQUENCE (SIZE(1..maxNrofSRS-ResourcesPerSet)) OF SRS-
ResourceId   OPTIONAL, -- Cond Setup
  resourceType            CHOICE {
    aperiodic            SEQUENCE {
      aperiodicSRS-ResourceTrigger      INTEGER (1..maxNrofSRS-TriggerStates-1),
      csi-RS            NZP-CSI-RS-ResourceId    OPTIONAL, -- Cond NonCodebook
      slotOffset          INTEGER (1..32)        OPTIONAL, -- Need S
      ..., [[
      aperiodicSRS-ResourceTriggerList      SEQUENCE (SIZE(1..maxNrofSRS-TriggerStates-2))
              OF INTEGER (1..maxNrofSRS-TriggerStates-1)    OPTIONAL -- Need M ]]
    },
    semi-persistent          SEQUENCE {
      associatedCSI-RS        NZP-CSI-RS-ResourceId  OPTIONAL, -- Cond NonCodebook
      ... },
```

```
    periodic                SEQUENCE {
        associatedCSI-RS        NZP-CSI-RS-ResourceId      OPTIONAL, -- Cond NonCodebook
        ...    } },
    usage               ENUMERATED {beamManagement, codebook, nonCodebook, antennaSwitching},
    alpha           Alpha                       OPTIONAL, -- Need S
    p0              INTEGER (-202..24)                      OPTIONAL, -- Cond Setup
    pathlossReferenceRS     PathlossReferenceRS-Config                  OPTIONAL, -- Need M
    srs-PowerControlAdjustmentStates   ENUMERATED { sameAsFci2, separateClosedLoop}
OPTIONAL, -- Need S
    ...,  [[
    pathlossReferenceRSList-r16   SetupRelease { PathlossReferenceRSList-r16}   OPTIONAL  -- Need M
    ]] }
PathlossReferenceRS-Config ::=          CHOICE {
    ssb-Index               SSB-Index,
    csi-RS-Index            NZP-CSI-RS-ResourceId   }
PathlossReferenceRSList-r16 ::=          SEQUENCE (SIZE (1..maxNrofSRS-PathlossReferenceRS-r16))
OF PathlossReferenceRS-r16
PathlossReferenceRS-r16 ::=          SEQUENCE {
    srs-PathlossReferenceRS-Id-r16       SRS-PathlossReferenceRS-Id-r16,
    pathlossReferenceRS-r16          PathlossReferenceRS-Config }
SRS-PathlossReferenceRS-Id-r16 ::=   INTEGER (0..maxNrofSRS-PathlossReferenceRS-1-r16)
SRS-PosResourceSet-r16 ::=          SEQUENCE {
    srs-PosResourceSetId-r16          SRS-PosResourceSetId-r16,
    srs-PosResourceIdList-r16          SEQUENCE (SIZE(1..maxNrofSRS-ResourcesPerSet)) OF SRS-
PosResourceId-r16          OPTIONAL, -- Cond Setup
    resourceType-r16          CHOICE {
        aperiodic-r16            SEQUENCE {
            aperiodicSRS-ResourceTriggerList-r16      SEQUENCE (SIZE(1..maxNrofSRS-TriggerStates-1))
                OF INTEGER (1..maxNrofSRS-TriggerStates-1)    OPTIONAL, -- Need M
            ... },
        semi-persistent-r16          SEQUENCE {
            ... },
        periodic-r16            SEQUENCE {
            ... } },
    alpha-r16               Alpha                    OPTIONAL, -- Need S
    p0-r16                  INTEGER (-202..24)                   OPTIONAL, -- Cond
Setup
    pathlossReferenceRS-Pos-r16           CHOICE {
        ssb-IndexServing-r16            SSB-Index,
        ssb-Ncell-r16               SSB-InfoNcell-r16,
        dl-PRS-r16                  DL-PRS-Info-r16
    }                      OPTIONAL, -- Need M    ... }
SRS-ResourceSetId ::=          INTEGER (0..maxNrofSRS-ResourceSets-1)
SRS-PosResourceSetId-r16 ::=          INTEGER (0..maxNrofSRS-PosResourceSets-1-r16)
```

```
SRS-Resource ::=                SEQUENCE {
   srs-ResourceId                 SRS-ResourceId,
   nrofSRS-Ports                  ENUMERATED {port1, ports2, ports4},
   ptrs-PortIndex                 ENUMERATED {n0, n1 }                   OPTIONAL,   -- Need R
   transmissionComb               CHOICE {       n2                      SEQUENCE {
      combOffset-n2               INTEGER (0..1),  cyclicShift-n2        INTEGER (0..7)      },
      n4                          SEQUENCE {    combOffset-n4            INTEGER (0..3),
      cyclicShift-n4               INTEGER (0..11)        }
   },
   resourceMapping                SEQUENCE {
      startPosition               INTEGER (0..5),
      nrofSymbols                 ENUMERATED {n1, n2, n4},
      repetitionFactor            ENUMERATED {n1, n2, n4}  },
   freqDomainPosition             INTEGER (0..67), freqDomainShift        INTEGER (0..268),
   freqHopping                    SEQUENCE {       c-SRS                 INTEGER (0..63),
      b-SRS                       INTEGER (0..3),   b-hop                INTEGER (0..3)   },
   groupOrSequenceHopping         ENUMERATED { neither, groupHopping, sequenceHopping },
   resourceType                   CHOICE {
      aperiodic                   SEQUENCE {  ...  },
      semi-persistent             SEQUENCE {
         periodicityAndOffset-sp           SRS-PeriodicityAndOffset,       ...  },
      periodic                    SEQUENCE {
         periodicityAndOffset-p            SRS-PeriodicityAndOffset,       ... } },
   sequenceId                     INTEGER (0..1023),
   spatialRelationInfo            SRS-SpatialRelationInfo                 OPTIONAL,   -- Need R
   ..., [[
   resourceMapping-r16            SEQUENCE {
      startPosition-r16           INTEGER (0..13),
      nrofSymbols-r16             ENUMERATED {n1, n2, n4},
      repetitionFactor-r16        ENUMERATED {n1, n2, n4}
   }                              OPTIONAL    -- Need R      ]] }
SRS-PosResource-r16::=           SEQUENCE {
   srs-PosResourceId-r16          SRS-PosResourceId-r16,
   transmissionComb-r16           CHOICE {       n2-r16                  SEQUENCE {
   combOffset-n2-r16              INTEGER (0..1),  cyclicShift-n2-r16          INTEGER (0..7)
      },
      n4-r16                      SEQUENCE {    combOffset-n4-16         INTEGER (0..3),
      cyclicShift-n4-r16           INTEGER (0..11)        },
      n8-r16                      SEQUENCE {    combOffset-n8-r16        INTEGER (0..7),
      cyclicShift-n8-r16           INTEGER (0..5)        },
   ... },
   resourceMapping-r16            SEQUENCE {
   startPosition-r16              INTEGER (0..13),
   nrofSymbols-r16                ENUMERATED {n1, n2, n4, n8, n12}  },
```

~~freqDomainShift-r16                                           INTEGER (0..268),~~
~~freqHopping-r16                                               SEQUENCE {~~
~~c-SRS-r16                                                     INTEGER (0..63),~~
~~...        },~~
    groupOrSequenceHopping-r16          ENUMERATED { neither, groupHopping, sequenceHopping },
    resourceType-r16                    CHOICE {
        aperiodic-r16                   SEQUENCE {
            slotOffset-r16                  INTEGER (1..32)                 OPTIONAL,   -- Need S
            ...    },
        semi-persistent-r16             SEQUENCE {
            periodicityAndOffset-sp-r16         SRS-PeriodicityAndOffset-r16,      ...    },
        periodic-r16                    SEQUENCE {
            periodicityAndOffset-p-r16          SRS-PeriodicityAndOffset-r16,      ...    } },
    sequenceId-r16                      INTEGER (0..65535),
    spatialRelationInfoPos-r16          SRS-SpatialRelationInfoPos-r16      OPTIONAL,   -- Need R
    ... }
SRS-SpatialRelationInfo ::=    SEQUENCE {
    servingCellId               ServCellIndex                           OPTIONAL,   -- Need S
    referenceSignal             CHOICE {
        ssb-Index               SSB-Index,
        csi-RS-Index            NZP-CSI-RS-ResourceId,
        srs                 SEQUENCE {
            resourceId              SRS-ResourceId,
            uplinkBWP               BWP-Id    }    }    }
SRS-SpatialRelationInfoPos-r16 ::=    CHOICE {
    servingRS-r16               SEQUENCE {
        servingCellId               ServCellIndex                       OPTIONAL,   -- Need S
        referenceSignal-r16         CHOICE {
            ssb-IndexServing-r16            SSB-Index,
            csi-RS-IndexServing-r16         NZP-CSI-RS-ResourceId,
            srs-SpatialRelation-r16         SEQUENCE {
                resourceSelection-r16           CHOICE {
                    srs-ResourceId-r16              SRS-ResourceId,
                    srs-PosResourceId-r16           SRS-PosResourceId-r16      },
                uplinkBWP-r16                   BWP-Id    }    },
    ssb-Ncell-r16               SSB-InfoNcell-r16,
    dl-PRS-r16                  DL-PRS-Info-r16    }
SSB-Configuration-r16  ::=      SEQUENCE {
    ssb-Freq-r16                ARFCN-ValueNR,
    halfFrameIndex-r16              ENUMERATED {zero, one},
    ssbSubcarrierSpacing-r16        SubcarrierSpacing,
    ssb-Periodicity-r16             ENUMERATED { ms5, ms10, ms20, ms40, ms80, ms160, spare2,spare1 }
OPTIONAL, -- Need S
    sfn0-Offset-r16             SEQUENCE {
        sfn-Offset-r16              INTEGER (0..1023),
        integerSubframeOffset-r16       INTEGER (0..9)          OPTIONAL -- Need R  }
    OPTIONAL, -- Need R

```
sfn-SSB-Offset-r16              INTEGER (0..15),
  ss-PBCH-BlockPower-r16          INTEGER (-60..50)       OPTIONAL -- Cond Pathloss }
SSB-InfoNcell-r16 ::=           SEQUENCE {
  physicalCellId-r16            PhysCellId,
  ssb-IndexNcell-r16            SSB-Index               OPTIONAL, -- Need S
  ssb-Configuration-r16         SSB-Configuration-r16   OPTIONAL -- Need S }
DL-PRS-Info-r16 ::=             SEQUENCE {
  dl-PRS-ID-r16                INTEGER (0..255),
  dl-PRS-ResourceSetId-r16        INTEGER (0..7),
  dl-PRS-ResourceId-r16         INTEGER (0..63)        OPTIONAL -- Need S }
SRS-ResourceId ::=                INTEGER (0..maxNrofSRS-Resources-1)
SRS-PosResourceId-r16 ::=            INTEGER (0..maxNrofSRS-PosResources-1-r16)
SRS-PeriodicityAndOffset ::=       CHOICE {
  sl1                 NULL,   sl2            INTEGER(0..1),
  sl4                 INTEGER(0..3), sl5            INTEGER(0..4),
  sl8                 INTEGER(0..7), sl10           INTEGER(0..9),
  sl16                INTEGER(0..15), sl20          INTEGER(0..19),
  sl32                INTEGER(0..31), sl40          INTEGER(0..39),
  sl64                INTEGER(0..63), sl80          INTEGER(0..79),
  sl160               INTEGER(0..159), sl320            INTEGER(0..319),
  sl640               INTEGER(0..639), sl1280           INTEGER(0..1279),
  sl2560              INTEGER(0..2559) }
SRS-PeriodicityAndOffset-r16 ::=      CHOICE {
  sl1                 NULL,
  sl2                 INTEGER(0..1),
  sl4                 INTEGER(0..3),
  sl5                 INTEGER(0..4),
  sl8                 INTEGER(0..7),
  sl10                INTEGER(0..9),
  sl16                INTEGER(0..15),
  sl20                INTEGER(0..19),
  sl32                INTEGER(0..31),
  sl40                INTEGER(0..39),
  sl64                INTEGER(0..63),
  sl80                INTEGER(0..79),
  sl160               INTEGER(0..159),
  sl320               INTEGER(0..319),
  sl640               INTEGER(0..639),
  sl1280              INTEGER(0..1279),
  sl2560              INTEGER(0..2559),
  sl5120              INTEGER(0..5119),
  sl10240             INTEGER(0..10239),
  sl40960             INTEGER(0..40959),
  sl81920             INTEGER(0..81919), ... }
-- TAG-SRS-CONFIG-STOP
-- ASN1STOP
```

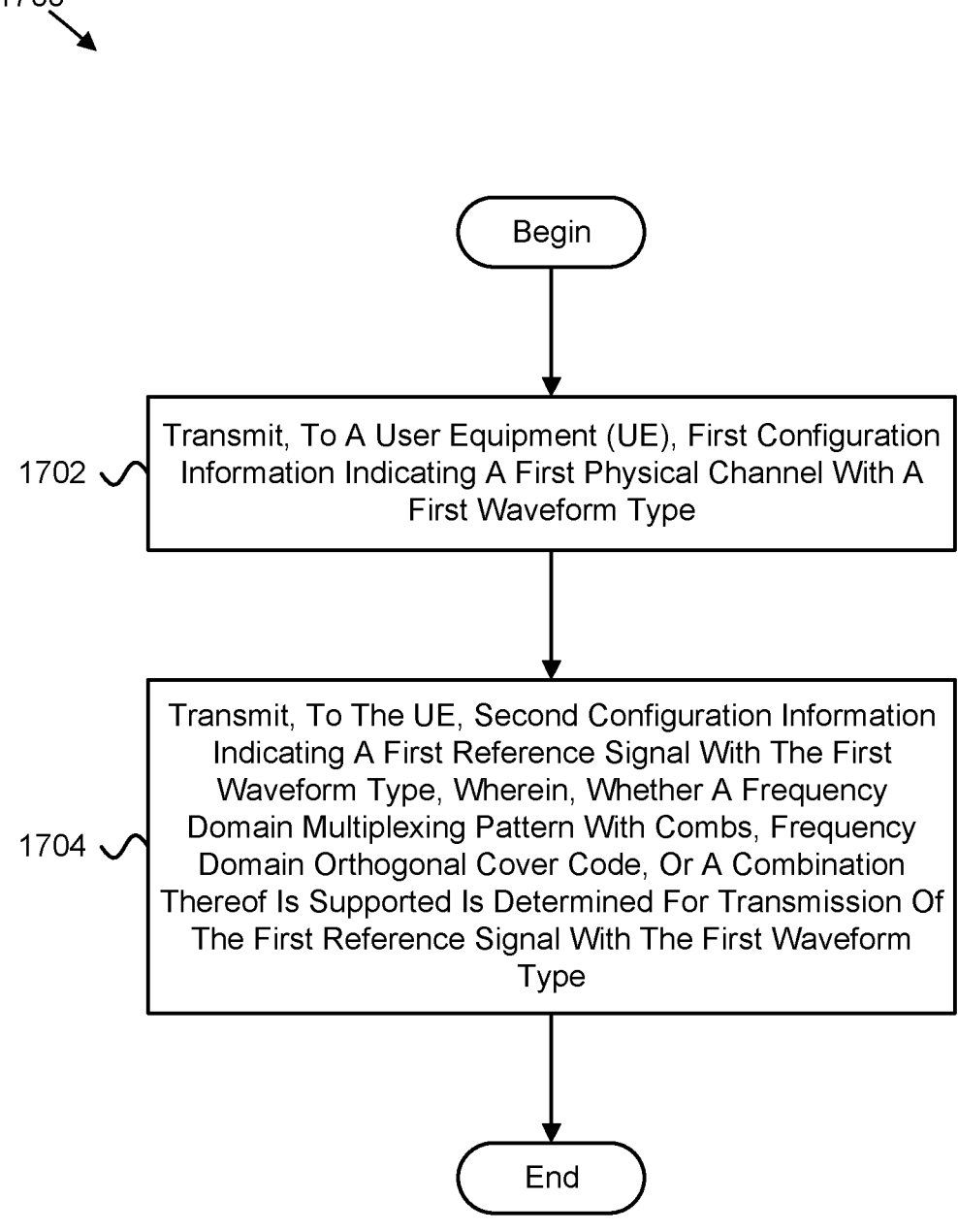

Begin

Transmit, To A User Equipment (UE), First Configuration Information Indicating A First Physical Channel With A First Waveform Type

1702

Transmit, To The UE, Second Configuration Information Indicating A First Reference Signal With The First Waveform Type, Wherein, Whether A Frequency Domain Multiplexing Pattern With Combs, Frequency Domain Orthogonal Cover Code, Or A Combination Thereof Is Supported Is Determined For Transmission Of The First Reference Signal With The First Waveform Type

1704

End

FIG. 17

CONFIGURING A REFERENCE SIGNAL CORRESPONDING TO A WAVEFORM TYPE

CROSS-REFERENCE TO RELATED APPLICATIONS

This application claims priority to U.S. Patent Application Ser. No. 63/160,176 entitled "APPARATUSES, METHODS, AND SYSTEMS FOR CONFIGURATION OF DL/UL REFERENCE SIGNALS FOR SC WAVEFORM" and filed on Mar. 12, 2021 for Ali Ramadan Ali, which is incorporated herein by reference in its entirety.

FIELD

The subject matter disclosed herein relates generally to wireless communications and more particularly relates to configuring a reference signal corresponding to a waveform type.

BACKGROUND

In certain wireless communications networks, single carrier waveforms may be used. In such networks, reference signals may be transmitted using the single carrier waveforms.

BRIEF SUMMARY

Methods for configuring a reference signal corresponding to a waveform type are disclosed. Apparatuses and systems also perform the functions of the methods. One embodiment of a method includes receiving, at a user equipment from a network device, first configuration information indicating a first physical channel with a first waveform type. In some embodiments, the method includes receiving, from a network device, second configuration information indicating a first reference signal with the first waveform type. In certain embodiments, the method includes determining whether a frequency domain multiplexing pattern with combs, frequency domain orthogonal cover code, or a combination thereof is supported for transmission of the first reference signal with the first waveform type.

One apparatus for configuring a reference signal corresponding to a waveform type includes a user equipment. In some embodiments, the apparatus includes a receiver that: receives, from a network device, first configuration information indicating a first physical channel with a first waveform type; and receives, from a network device, second configuration information indicating a first reference signal with the first waveform type. In various embodiments, the apparatus includes a processor that determines whether a frequency domain multiplexing pattern with combs, frequency domain orthogonal cover code, or a combination thereof is supported for transmission of the first reference signal with the first waveform type.

Another embodiment of a method for configuring a reference signal corresponding to a waveform type includes transmitting, from a network device to a user equipment (UE), first configuration information indicating a first physical channel with a first waveform type. In some embodiments, the method includes transmitting, to the UE, second configuration information indicating a first reference signal with the first waveform type, wherein, whether a frequency domain multiplexing pattern with combs, frequency domain orthogonal cover code, or a combination thereof is supported is determined for transmission of the first reference signal with the first waveform type.

Another apparatus for configuring a reference signal corresponding to a waveform type includes a network device. In some embodiments, the apparatus includes a transmitter that: transmits, to a user equipment (UE), first configuration information indicating a first physical channel with a first waveform type; and transmits, to the UE, second configuration information indicating a first reference signal with the first waveform type, wherein, whether a frequency domain multiplexing pattern with combs, frequency domain orthogonal cover code, or a combination thereof is supported is determined for transmission of the first reference signal with the first waveform type.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a block diagram illustrating one embodiment of a DMRS-DownlinkConfig;

FIG. 5 is a block diagram illustrating one embodiment of a SC-DMRS-DownlinkConfig information element;

FIG. 6 is a schematic block diagram illustrating one embodiment of a time domain representation of a PDSCH slot with DMRS;

FIG. 9 is a block diagram illustrating one embodiment of a DMRS-UplinkConfig IE;

FIG. 10 is a block diagram illustrating one embodiment of CSI-RS resource mapping;

FIG. 12 is a block diagram illustrating one embodiment of a CSI-IM resource;

FIGS. 13A and 13B are block diagrams illustrating one embodiment of time mapping parameters for a PRS configuration;

FIGS. 14A, 14B, and 14C are schematic block diagrams illustrating one embodiment of PRS from multiple cells for DL-TDoA measurement;

FIGS. 15A, 15B, 15C, 15D, and 15E are block diagrams illustrating one embodiment of an SRS-Config information element;

FIG. 17 is a flow chart diagram illustrating another embodiment of a method for configuring a reference signal corresponding to a waveform type.

DETAILED DESCRIPTION

Figure 1:
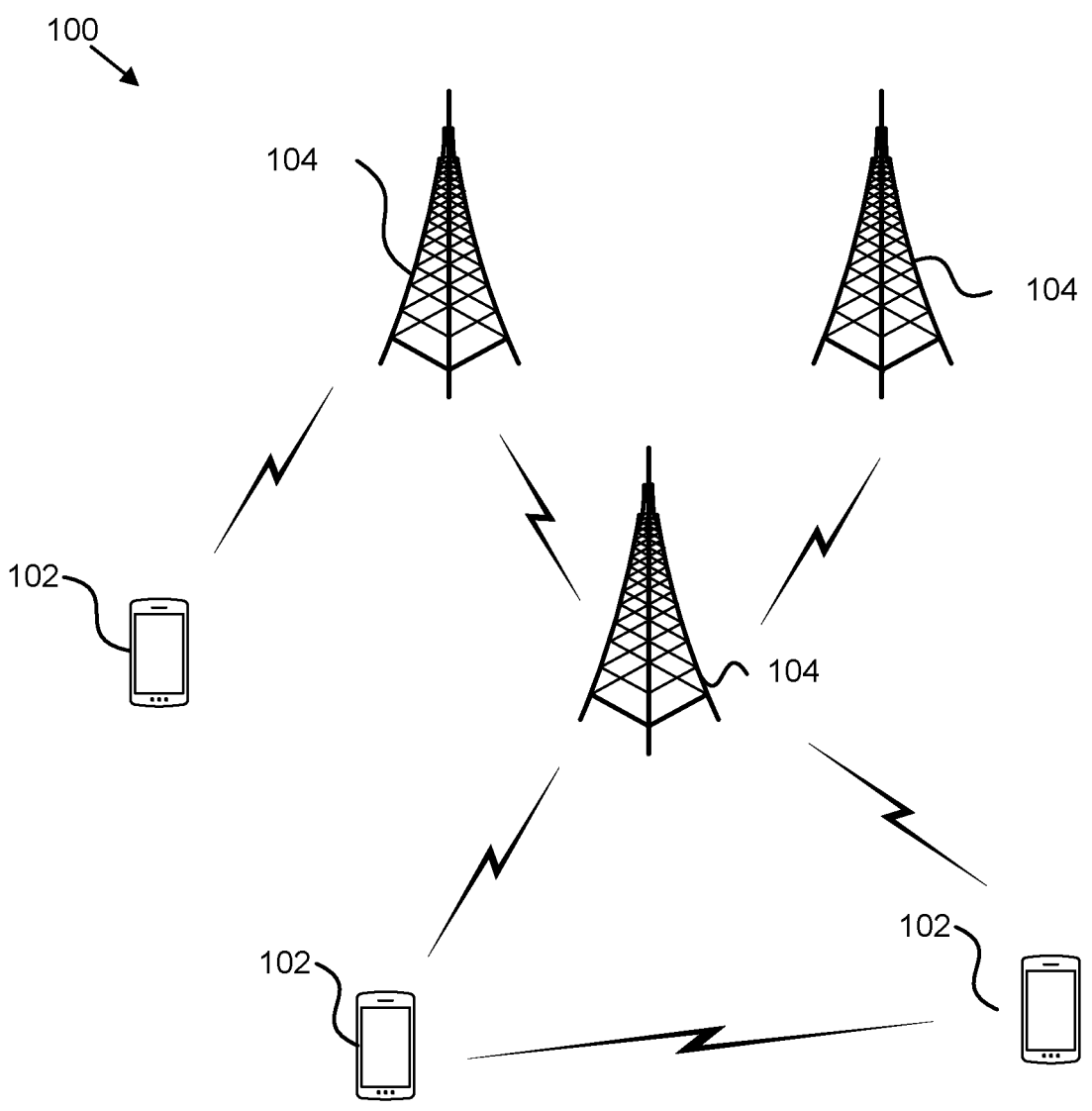
FIG. 1 is a schematic block diagram illustrating one embodiment of a wireless communication system for configuring a reference signal corresponding to a waveform type.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring a reference signal corresponding to a waveform type. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, user equipment ("UE"), user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive, at a user equipment from a network device, first configuration information indicating a first physical channel with a first waveform type. In some embodiments, the remote unit 102 may receive, from a network device, second configuration information indicating a first reference signal with the first waveform type. In certain embodiments, the remote unit 102 may determine whether a frequency domain multiplexing pattern with combs, frequency domain orthogonal cover code, or a combination thereof is supported for transmission of the first reference signal with the first waveform type. Accordingly, the remote unit 102 may be used for configuring a reference signal corresponding to a waveform type.

In certain embodiments, a network unit 104 may transmit, from a network device to a user equipment (UE), first configuration information indicating a first physical channel with a first waveform type. In some embodiments, the network unit 104 may transmit, to the UE, second configuration information indicating a first reference signal with the first waveform type, wherein, whether a frequency domain multiplexing pattern with combs, frequency domain orthogonal cover code, or a combination thereof is supported is determined for transmission of the first reference signal with the first waveform type. Accordingly, the network unit 104 may be used for configuring a reference signal corresponding to a waveform type.

Figure 2:
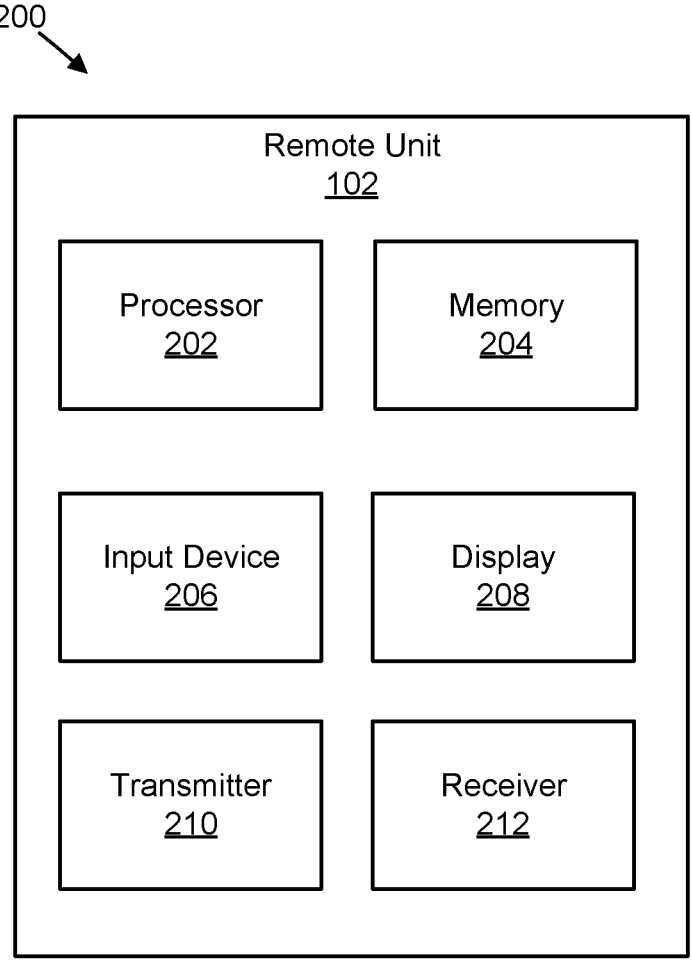
FIG. 2 is a schematic block diagram illustrating one embodiment of an apparatus that may be used for configuring a reference signal corresponding to a waveform type.

FIG. 2 depicts one embodiment of an apparatus 200 that may be used for configuring a reference signal corresponding to a waveform type. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212: receives, from a network device, first configuration information indicating a first physical channel with a first waveform type; and receives, from a network device, second configuration information indicating a first reference signal with the first waveform type. In various embodiments, the processor 202 determines whether a frequency domain multiplexing pattern with combs, frequency domain orthogonal cover code, or a combination thereof is supported for transmission of the first reference signal with the first waveform type.

Although only one transmitter 210 and one receiver 212 are illustrated, the remote unit 102 may have any suitable number of transmitters 210 and receivers 212. The trans-

US 12,640,971 B2

9 mitter 210 and the receiver 212 may be any suitable type of transmitters and receivers. In one embodiment, the transmitter 210 and the receiver 212 may be part of a transceiver.

Figure 3:
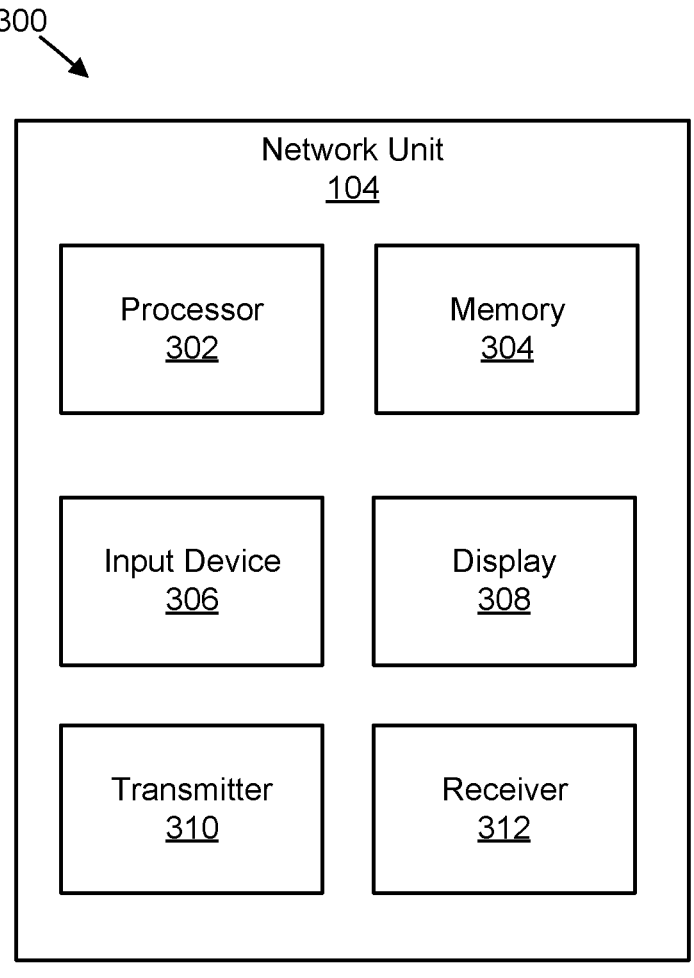
FIG. 3 is a schematic block diagram illustrating one embodiment of an apparatus that may be used for configuring a reference signal corresponding to a waveform type.

FIG. 3 depicts one embodiment of an apparatus 300 that may be used for configuring a reference signal corresponding to a waveform type. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits, to a user equipment (UE), first configuration information indicating a first physical channel with a first waveform type; and transmits, to the UE, second configuration information indicating a first reference signal with the first waveform type, wherein, whether a frequency domain multiplexing pattern with combs, frequency domain orthogonal cover code, or a combination thereof is supported is determined for transmission of the first reference signal with the first waveform type.

It should be noted that one or more embodiments described herein may be combined into a single embodiment.

In certain embodiments, such as in new radio ("NR"), a multi-carrier (e.g., cyclic prefix ("CP") orthogonal frequency division multiplexing ("OFDM") ("CP-OFDM")) based waveform has been adopted for downlink ("DL") as well as for uplink ("UL") and additionally single carrier (e.g., discrete Fourier transform ("DFT") spread OFDM ("DFT-s-OFDM") or CP frequency division multiplexing ("FDM") ("CP-SC-FDM")) is used for UL. However, CP-OFDM performance degrades at high frequencies (e.g., beyond 71 GHz) due to its sensitivity to phase noise and its high peak to average power ratio ("PAPR") or cubic metric ("CM") that limits the cell coverage, edge of cell performance, and higher UE power consumption. The problems of CP-OFDM at high frequencies become severe as the modulation order and/or the channel bandwidth increases. The problems make a single carrier waveform such as single carrier ("SC") frequency domain equalizer ("FDE") ("SC-FDE"), a suitable candidate at very high frequencies due to its natural robustness against phase noise and its low PAPR and/or CM. In some embodiments, NR operations may support from 52.6 GHz to 71 GHz. In various embodiments, CP-OFDM only is used for DL for 52.6 GHz to 71 GHz and higher subcarrier spacing.

In various embodiments, configuration and signaling aspects may facilitate reference signal transmission and/or reception for SC and/or SC-FDE.

In certain embodiments, there may be configuration and signaling of reference signals for DL and/or UL if SC and/or SC-FDE is used. The SC waveform restricts the mapping of the resources to only time domain mapping which leads to different reference signal ("RS") configuration as compared to CP-OFDM and/or DFT-s-OFDM.

In some embodiments, for RS configuration there may be: 1) a configuration for DL and/or UL demodulation reference signal ("DMRS") generation and mapping including modifications and/or restrictions of the DMRS configuration; 2) a configuration for channel state information reference signal ("CSI-RS") generation and mapping; 3) a configuration for positioning reference signal ("PRS") mapping for multiple cell measurements; and/or 4) a configuration of sounding reference signal ("SRS") patterns and configuration.

In a first embodiment, there may be a DL DMRS configuration for a SC waveform. According to the first embodiment, a UE is semi statically configured with a DMRS considering the SC and/or SC-FDE waveform. If configured with a DMRS considering the SC and/or SC-FDE waveform, the UE generates a time domain sequence g(n) for DMRS based on a pseudo-random sequence initialized/scrambled with an identifier ("ID") signaled semi-statically or is scrambled with a cell ID. The UE receives DMR-DownlinkConfig containing DMRS generation and/or mapping parameters such as additional positions, scrambling IDs, and so forth. The UE is not expected to receive the dmrs-Type in DMR-DownlinkConfig and/or shall not assume type 1 dmrs configuration if it is configured, during initial access or by radio resource control ("RRC") reconfiguration, with SC and/or SC-FDE waveform. FIG. 4 is a block diagram illustrating one embodiment of a DMRS-DownlinkConfig 400.

In one implementation of the first embodiment, a new type (e.g., type 3) is specified in dmrs-Type for SC. This type only indicates that a DMRS configuration is in a time domain and for SC systems. In another implementation of the first embodiment, a new type is added that differentiates between the DMRS symbol type for SC and SC-FDE (e.g., with or without cyclic prefix.

In some embodiments, a new RRC IE is added such as SC-DMRS-DownlinkConfig in addition to an existing IE for DMRS. A UE can be configured with either both the IEs for DMRS or only one of them. If the UE is configured with both, then depending upon which waveform is configured and/or indicated to the UE, then the corresponding DMRS configuration is expected to be applied. In one implementation, the UE is either semi-statically or dynamically configured to use SC-FDE for DL, then the UE is expected to apply the DMRS configuration according to SC-DMRS-DownlinkConfig. In an alternate implementation, the DMRS configuration to be applied is indicated regardless of the waveform type indicated to the UE.

FIG. 5 is a block diagram illustrating one embodiment of a SC-DMRS-DownlinkConfig information element ("IE") 500. In some embodiments, a length of a DMRS can be configurable. In one implementation, more than a length 2 DMRS can be configured for SC-DMRS. In some embodiments, a maximum number of orthogonal demodulation reference signal ("DM-RS", "DMRS") ports depend on only a length of DMRS. For example, if length 2 DMRS is configured, then a maximum of 2 orthogonal ports can be used. If length 4 DMRS is configured, then a maximum of 4 orthogonal ports can be used.

In some embodiments, if a single carrier waveform is applied, a UE is not expected to apply frequency division multiplexing ("FDM") and/or frequency division orthogonal cover code ("FD-OCC") or any comb pattern for DM-RS. Moreover, only time-domain multiplexing such as time division multiplexing ("TDM") and/or time division ("TD") orthogonal cover code ("TD-OCC") may be applied.

In various embodiments, a UE may assume a sequence g(n) is scaled by a factor $$\beta_{PDSCH}^{DMRS}$$

for transmission power adjustment and mapped to time domain resource elements $(s,l)_p$ according to:

$$a_{s,l}^{(p)} = \beta_{PDSCH}^{DMRS} w_s(s') w_t(l') g(2n + s'),$$

where s={0, 1, ... N, l=Ī+l', n=0, 1, ..., s is the time domain sample index in block l, N is the block and/or symbol length in number of samples, l is the symbol and/or time-domain block index, $w_s(s')$ is either +1 or −1 for all samples in a DMRS block, and p is the antenna port. The subcarrier spacing ("SCS") and frequency index are skipped. For SC and/or SC-FDE waveform, the UE is not expected to receive other RS or other channels in the same symbol and/or block used for DMRS. An example of DMRS time domain mapping with mapping type B is shown in FIG. 6.

FIG. 6 is a schematic block diagram illustrating one embodiment of a time domain representation 600 of a physical downlink shared channel ("PDSCH") slot with DMRS. The time domain representation 600 is illustrated over a slot length 602 and includes guard interval ("GI"), DMRS, and PDSCH. Specifically, there is a front-loaded DMRS 604, and at least one additional DMRS 606. An RX fast Fourier transform ("FFT") window 608 is further illustrated.

In one embodiment, as shown in FIG. 6, for DMRS and PDSCH time domain signal are grouped in blocks containing length N samples for DMRS which could be for DMRS configuration and PDSCH configuration in RRC and for PDSCH, a guard interval is inserted for each block to match the size of the FFT and to allow for frequency domain receiver processing such as channel estimation and equalization to cope with the multipath effect and then the PDSCH config contains 'M' number of guard intervals and then 'X' number of samples in each guard interval, the number of samples in each guard interval could be configured to be same and/or similar otherwise the number of samples for each guard interval could be differently configured. The DL slot contains one or more DMRS blocks and/or symbols and PDSCH blocks and/or symbols which could be semi-statically configured. The number of blocks to be used in a PDSCH is signaled in downlink control information ("DCI"). In another embodiment, there is a table containing a number of blocks of PDSCH to be mapped for mini slots and slots which contain multiple symbol lengths or time durations which could be implemented in a DL time domain resource allocation ("TDRA") table and signaled in DCI as a row index. DMRS blocks and/or symbols are mapped in a time domain based on a DMRS configuration signaled in DCI and semi-statically configured. A semi-static physical downlink control channel ("PDCCH") configuration contains 'X' number of samples in a group containing M control resource sets ("CORESETs") in a slot, otherwise the PDCCH configuration may contain 'X' number of samples for each CORESET and/or search space. A number of groups for PDCCH may be semi-statically configured in a slot.

Figure 7:
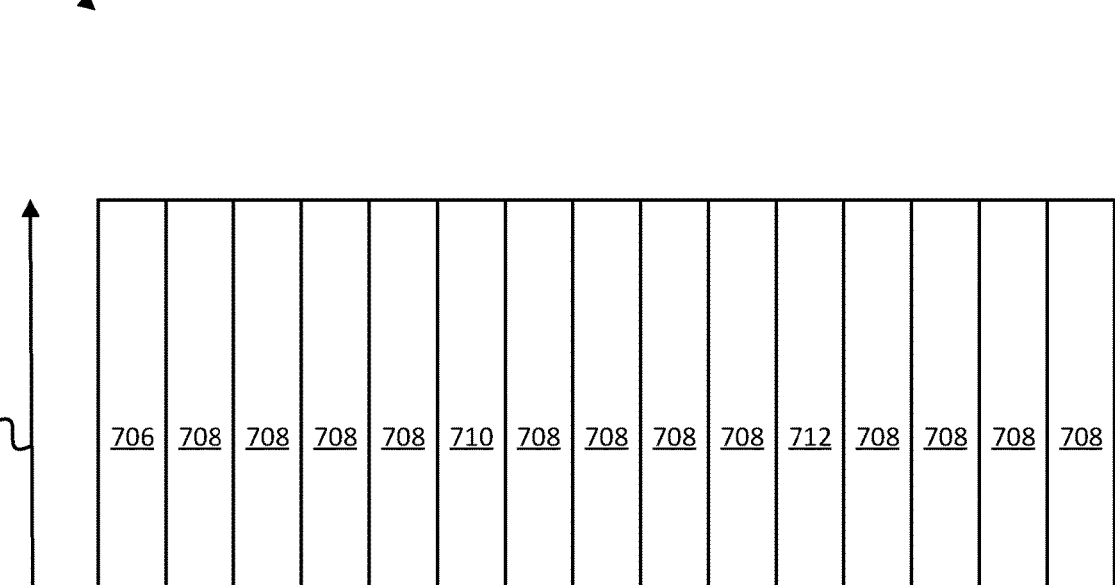
FIG. 7 is a schematic block diagram illustrating one embodiment of a time and/or frequency domain representation of a PDSCH slot with DMRS.

FIG. 7 is a schematic block diagram illustrating one embodiment of a time and/or frequency domain representation 700 of a PDSCH slot with DMRS over symbols 702 in a slot and a SC bandwidth 704. The symbols 702 include a front loaded DMRS 706, PDSCH 708, and additional DMRS symbols 710 and 712.

In various embodiments, a UE may be configured with DMRS mapped to one or two successive symbols and configured with code division multiplexing ("CDM") groups and antenna ports for multiple-input multiple-output ("MIMO") PDSCH transmission. The CDM and/or orthogonal cover code ("OCC") is performed only in a time domain as depicted in FIG. 8 for double DMRS symbols.

Figure 8:
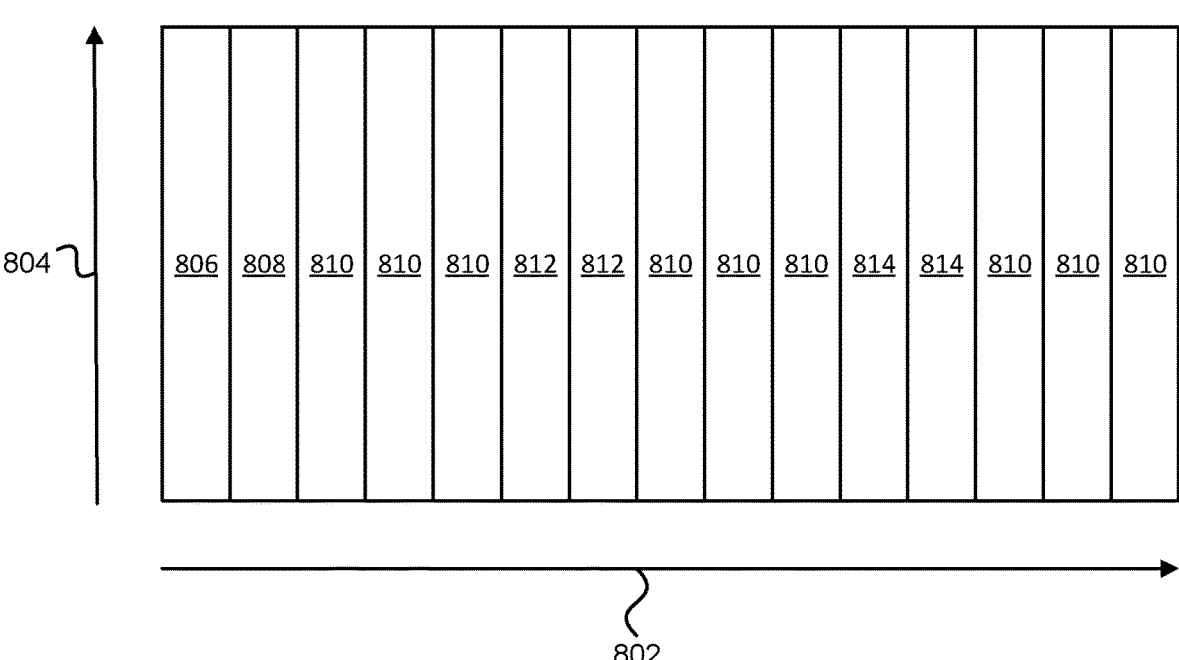
FIG. 8 is a schematic block diagram illustrating one embodiment of time domain CDM for multi-port DMRS.

FIG. 8 is a schematic block diagram illustrating one embodiment of time domain CDM 800 for multi-port DMRS over symbols 802 in a slot and a SC bandwidth 804. The symbols 802 include a front loaded DMRS 806 and 808, PDSCH 810, and additional DMRS symbols 812 and 814.

Table 1 includes information for mapping DMRS with different CDM groups and/or ports and includes only time domain related parameters for DMRS mapping. Table 1 shows an example of two ports with TD-CDM2 where only time domain parameters are used.

TABLE 1

| | CDM | | $w_t(l')$ | |
|---|---|---|---|---|
| p | group | Δ | l' = 0 | l' = 1 |
| 1000 | 0 | 0 | +1 | −1 |
| 1001 | 0 | 0 | −1 | +1 |

In certain embodiments, a UE is configured with multiple configurations, each is related to one waveform to be used in DL (e.g., DMR-DownlinkConfig-CP-OFDM, DMR-DownlinkConfig-SC, and so forth).

In some embodiments, a UE is configured with unified configuration for both CP-OFDM and SC or other waveforms, and upon receiving an indication of using SC and/or SC-FDE waveform for DL, the UE ignores the CP-OFDM frequency related parameters for DMRS generation and mapping (e.g., the UE ignores the frequency mapping of the resources and FD-CDM for multi-port DMRS).

In various embodiments, an antenna port table (e.g., Table 2) is used to indicate DMRS ports for single carrier DMRS configuration.

TABLE 2

| Value | DMRS port(s) | Number of front-load symbols |
|---|---|---|
| 0 | 0 | 1 |
| 1 | 1 | 2 |
| 2 | 0, 1 | 2 |
| 3 | Reserved | Reserved |

In certain embodiments, a synchronization signal block ("SSB") may be mapped in a time domain with 'X' number of samples for a primary synchronization signal ("PSS"), a secondary synchronization signal ("SSS"), and a physical broadcast channel ("PBCH") and, if necessary, 'N' number of guard intervals are inserted for the receiver inverse fast Fourier transform ("IFFT") and/or fast Fourier transform ("FFT") operation.

In some embodiments, a code block group and/or code block segmentation may be performed based on an 'X' number of samples. In various embodiments, for transport block size ("TBS") calculation, an 'N' number of samples for guard time may be used.

In various embodiments, a slot includes 'N' number of samples for PDCCH followed by 'M' number of samples for PDSCH, 'O' number of samples for DMRS, 'P' number of samples for CSI-RS, and 'Q' number of samples for PDSCH. In certain embodiments, multiple tables are defined containing time units for time domain mapping information for PDCCH, PDSCH, a physical uplink shared channel ("PUSCH"), and/or a physical uplink control channel ("PUCCH") and all other DL and UL RS. A PDCCH configuration may contain a semi-static time unit by indicating one of a row index and DCI that may indicate dynamically a row index for PDSCH, DMRS, CSI-RS, and so forth depending on which RS is present in a slot.

In a second embodiment, there may be an UL DMRS configuration for a SC waveform. According to the second embodiment, for SC and/or SC-FDE waveforms, only time domain related parameters are used in a DMRS-UplinkConfig IE to configure uplink demodulation reference signals for PUSCH. For instance, in one implementation, the fields such as dmrs-Type, transformPrecodingDisabled, and transformPrecodingEnabled are omitted in the information element DMRS-UplinkConfig, as illustrated in FIG. 9. If all these fields are absent, the UE is not expected to use DMRS type 1.

FIG. 9 is a block diagram illustrating one embodiment of a DMRS-UplinkConfig IE 900.

In one embodiment, a field phaseTrackingRS may not be used for SC and/or SC-FDE systems. In another embodiment, a DMRS type may be indicated for SC and/or SC-FDE systems. Upon receiving this type, it may be assumed that all DMRS related parameters are for SC and/or SC-FDE systems and are in the time domain. In a further embodiment, fields indicating SC and/or SC-FDE parameters may be added in an IE.

In certain embodiments, multiple configurations are used for different uplink waveforms, each indicating possible waveform to be used in UL (e.g., DMRS-uplinkConfig-CP-OFDM, DMRS-uplinkConfig-DFT-s-OFDM, DMRS-uplinkConfig-SC, and so forth).

In some embodiments, a unified configuration is used in UL for multiple waveforms. Upon receiving an explicit or implicit indication, the parameters related to other waveforms are ignored. For example, upon receiving an indication of using an SC or an SC-FDE waveform for UL, CP-OFDM frequency related parameters or any other waveform related parameters for DMRS generation and mapping are ignored.

In a third embodiment, there may be a CSI-RS configuration for an SC waveform. According to the third embodiment, a UE is configured with a CSI-RS resource set configuration for CSI-RS generation and/or mapping. A CSI-RS-Resource mapping is restricted only to time domain related mapping parameters. The choices for number of ports may be reduced and a CDM-Type is restricted only to TD-CDM. The UE is not expected to receive any frequency domain related parameters for mapping and/or generation CSI-RS such as freqBand, the density ρ, and so forth. The UE is not expected to receive other RS or other signals and/or channels in the same symbol and/or block used for CSI-RS.

FIG. 10 is a block diagram illustrating one embodiment of CSI-RS resource mapping 1000.

Figure 11:
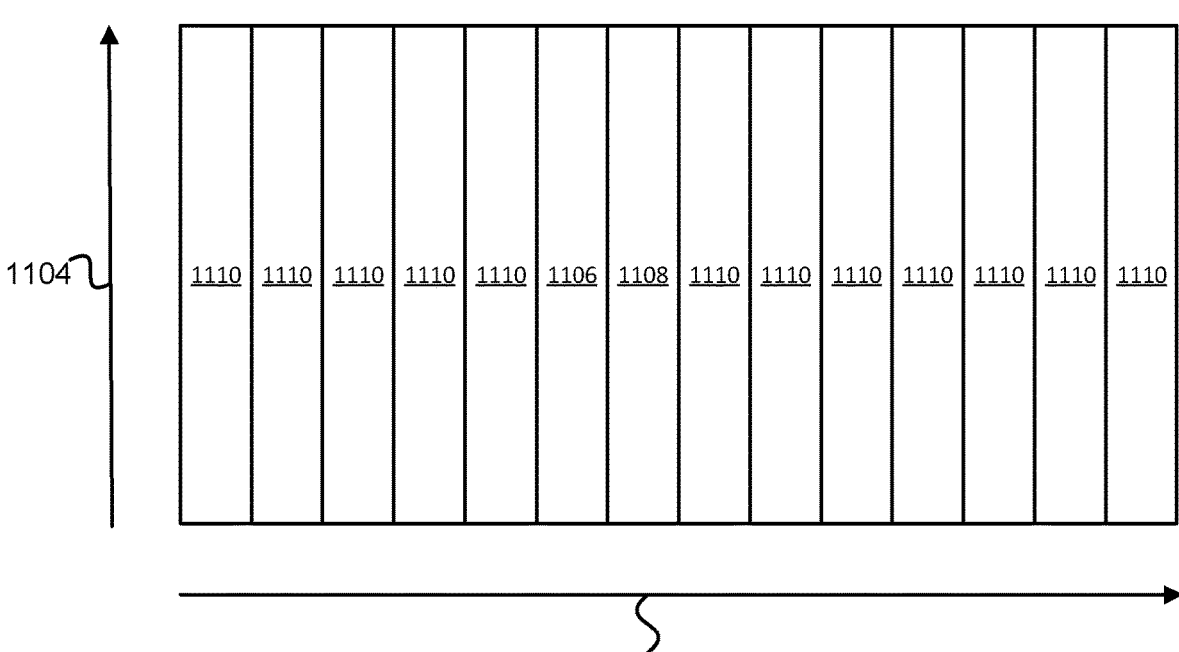
FIG. 11 is a schematic block diagram illustrating one embodiment of time and/or frequency domain representation of a DL slot with CSI-RS.

In various embodiments, a UE may be configured with multiple CSI-RS ports, where TD-CDM is performed on successive symbols and/or blocks. FIG. 11 shows an example of two ports CSI-RS mapping with TD-CDM2.

Specifically, FIG. 11 is a schematic block diagram illustrating one embodiment of time and/or frequency domain representation 1100 of a DL slot with CSI-RS over symbols 1102 in a slot and a SC bandwidth 1104. The symbols 1102 include a two symbol CSI-RS 1106 and 1108 and PDSCH 1110.

TABLE 3

| | | | | | CDM | |
| | Ports | | | (Ī), only Ī | group | |
| Row | X | ρ | cdm-Type | is indicated | index j | Ī' |
|---|---|---|---|---|---|---|
| 1 | 1 | — | noCDM | $(l_0)$, | 0 | 0 |
| 2 | 2 | — | td-CDM2 | $(l_0), (l_0 + 1)$ | 0, 1 | 0, 1 |
| 3 | 4 | — | td-CDM4 | $(l_0), (l_0 + 1),$ $(l_0 + 2), (l_0 + 3)$ | 0, 1, 2, 3 | 0, 1, 2, 3 |

In certain embodiments, a UE may be configured with a CSI-RS periodicity such that the CSI-RS resources are repeated in DL slots with periodicity and offset. The UE receives a configuration for symbols and/or blocks used for channel state information ("CSI") interference measurement ("IM") ("CSI-IM") to perform interference measurement. The UE is configured via higher layers with CSI-IM resources in time that include the location and/or symbol index and number of ports for CSI-IM. The UE is not expected to receive frequency related parameters.

FIG. 12 is a block diagram illustrating one embodiment of a CSI-IM resource 1200.

In some embodiments, a UE is configured with multiple configurations, and each is related to a possible waveform to be used in DL (e.g., CSI-RS-ResourceMapping-CP-OFDM, CSI-RS-ResourceMapping-SC, CSI-IM-Resource-CP-OFDM, CSI-IM-Resource-SC, and so forth).

In various embodiments, a UE may be configured with unified CSI-RS configuration for CP-OFDM and SC, and upon receiving an indication, during the initial access or later, to use one of the waveforms (e.g., SC waveform for DL). The UE ignores the other waveform related parameters (e.g., CP-OFDM frequency related parameters for CSI-RS and/or CSI-IM). For instance, the UE ignores the frequency mapping of the resources and FD-CDM for multi-port CSI-RS in case of an SC waveform.

In a fourth embodiment, there may be a PRS configuration for an SC waveform. According to the fourth embodiment, a UE is configured with a positioning reference signal ("PRS") for performing radio access technology ("RAT") dependent positioning methods (e.g., DL time difference of arrival ("TDoA") ("DL-TDoA") measurements of multiple cells. For each downlink PRS resource configured, the UE assumes the time domain sequence g(m) is scaled with a factor $\beta_{PRS}$ and mapped to time domain symbols with skipping the SCS, and the frequency generation and/or mapping parameters as follows:

$$a_{k,l}^{(p,\mu)} = \beta_{PRS} g(m), \ m = 0, 1, \dots, k = mK_{comb}^{PRS} + \left( \left( k_{offset}^{PRS} + k' \right) \mathrm{mod} K_{comb}^{PRS} \right),$$

$$\text{and } l = l_{start}^{PRS}, l_{start}^{PRS} + 1, \dots, l_{start}^{PRS} + L_{PRS} - 1.$$

For example, the UE is not expected to receive DL-PRS-PositioningFrequencyLayer or DL-PRS-SubcarrierSpacing DL and receives only time related mapping parameters such as PRS-ResourceRepetitionFactor, DL-PRS-ResourceTimeGap, and so forth. In addition, a muting configuration may be time dependent corresponding to PRS occasions which will be transmitted with zero power to reduce inter-cell PRS interference. A periodicity and resource set slot offset may be defined only along a time. One example of time mapping parameters for a PRS configuration is shown in FIGS. 13A and 13B. Specifically, FIGS. 13A and 13B are a block diagrams illustrating one embodiment of time mapping parameters 1300 for a PRS configuration.

In various embodiments, a SC PRS configuration may be identifiable based on the following hierarchy: 1) NR global cell ID which globally and uniquely identifies an NR cell; 2) a physical cell ID which defines a physical identity of a transmission and reception point ("TRP"); and/or 3) a DL PRS ID that is used along with a DL-PRS resource set ID and a DL-PRS resource ID to uniquely identify a DL-PRS resource, and is associated with a single TRP.

In certain embodiments, a generated PRS is mapped to some symbols and/or blocks with an offset configured by a network. This offset indicates an index of a first symbol used for PRS transmission from the serving cell and the offset for PRS used by other cells to measure is calculated based on an SC PRS configuration ID hierarchy. The UE measures an applicable positioning-related measurement (e.g., DL reference signal time difference ("RSTD") from a serving cell) and applies the configured time domain offset based on the SC PRS configuration ID hierarchy of non-serving cells listed for TDoA measurement and RSTD reporting. This is applicable to other positioning measurements such as UE receive ("RX") and/or transmit ("TX") ("RX-TX") time difference to enable multiple round trip time ("RTT") ("multi-RTT") methods as well as PRS reference signal received power ("RSRP") measurements relevant for DL-AoD positioning methods. The UE is not expected to receive other RS or other signals and/or channels in the slots configured for PRS transmission.

Figure 14A:
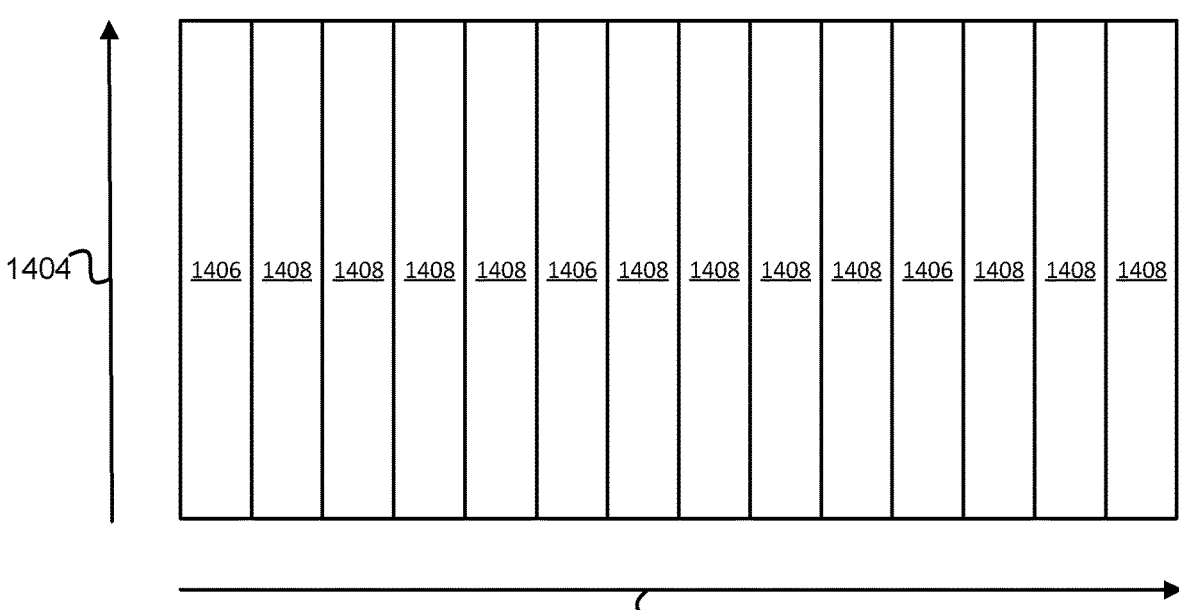

FIGS. 14A, 14B, and 14C are schematic block diagrams illustrating one embodiment of PRS from multiple cells for DL-TDoA measurement over symbols 1402 in a slot and a SC bandwidth 1404. The symbols 1402 include PRS 1406, 1410, and 1412 that have a time domain offset for different cells (e.g., FIG. 14A illustrates a serving cell, FIG. 14B illustrates a second cell, FIG. 14C illustrates a third cell), and PDSCH 1408.

In a fifth embodiment, there may be an SRS configuration for an SC waveform in UL. According to the fifth embodiment, if an SC waveform is configured and/or indicated for UL, then the SRS multiplexing and/or patterns with CDM in frequency are not allowed and only TDM and/or TD-OCC is allowed. The SRS configuration is restricted only to time domain related parameters and other frequency related parameters such as transmissionComb, combOffset, freqDomainPosition, freqHopping are not included in the configuration message. If the UE receives a unified configuration for different waveforms, the UE ignores the frequency related parameters if it is indicated with SC for UL. An illustration of an SRS-Config IE is show in FIGS. 15A through 15E. Specifically, FIGS. 15A, 15B, 15C, 15D, and 15E are block diagrams illustrating one embodiment of an SRS-Config IE 1500.

Figure 16:
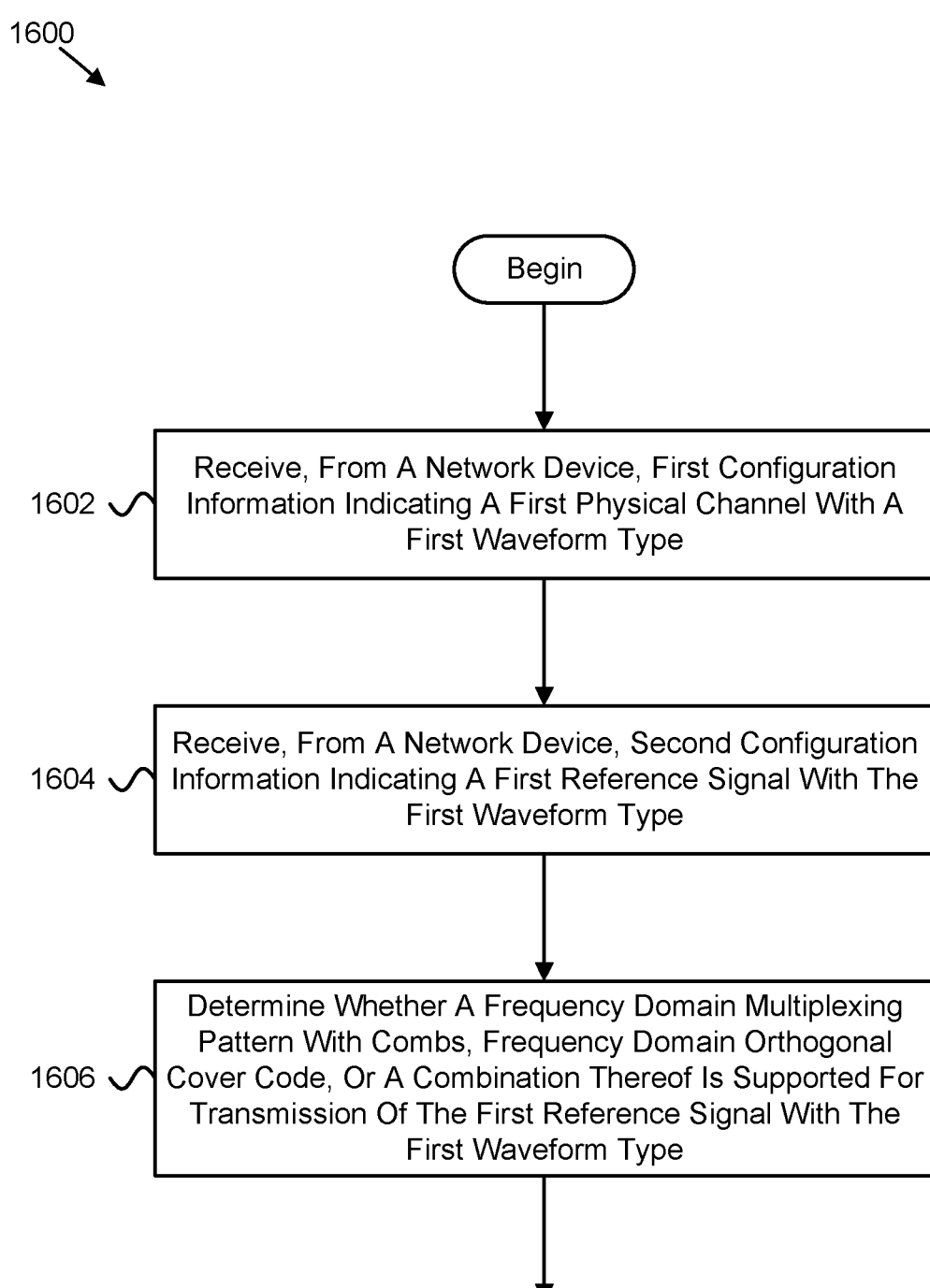
FIG. 16 is a flow chart diagram illustrating one embodiment of a method for configuring a reference signal corresponding to a waveform type.

FIG. 16 is a flow chart diagram illustrating one embodiment of a method 1600 for configuring a reference signal corresponding to a waveform type. In some embodiments, the method 1600 is performed by an apparatus, such as the remote unit 102. In certain embodiments, the method 1600 may be performed by a processor executing program code, for example, a microcontroller, a microprocessor, a CPU, a GPU, an auxiliary processing unit, a FPGA, or the like.

In various embodiments, the method 1600 includes receiving 1602, at a user equipment from a network device, first configuration information indicating a first physical channel with a first waveform type. In some embodiments, the method 1600 includes receiving 1604, from a network device, second configuration information indicating a first reference signal with the first waveform type. In certain embodiments, the method 1600 includes determining 1606 whether a frequency domain multiplexing pattern with combs, frequency domain orthogonal cover code, or a combination thereof is supported for transmission of the first reference signal with the first waveform type.

In certain embodiments, the first waveform type comprises a single carrier waveform. In some embodiments, the second configuration information comprises time-domain patterns for demodulation reference signal (DMRS) sequence generation, DMRS time domain mapping, or a combination thereof. In various embodiments, the method 1600 further comprises receiving a configuration for generating a DMRS pseudo-random sequence in a time domain to be mapped to consecutive samples in a DMRS symbol, a DMRS block, or a combination thereof.

In one embodiment, the method 1600 further comprises receiving a DMRS downlink configuration comprising parameters restricted to only time domain parameters, wherein the parameters comprise additional DMRS symbols, a number of ports, a time domain code division multiplexing (TD-CDM) type, or some combination thereof. In certain embodiments, the method 1600 further comprises receiving a unified DMRS downlink configuration corresponding to cyclic prefix (CP) orthogonal frequency domain multiplexing (OFDM) (CP-OFDM), a single carrier (SC), an SC frequency domain equalizer (FDE) (SC-FDE), or some combination thereof, and ignoring configured frequency related parameters with a SC waveform, a SC-FDE waveform, or a combination thereof for DL. In some embodiments, the second configuration information comprises time-domain patterns for channel state information reference signal (CSI-RS) sequence generation, CSI-RS time-domain mapping, or a combination thereof.

In various embodiments, the method 1600 further comprises receiving a configuration for generating a CSI-RS sequence in a time domain to be mapped to consecutive samples in a CSI-RS symbol, a CSI-RS block, or a combination thereof. In one embodiment, the method 1600 further comprises receiving a CSI-RS resource mapping comprising parameters restricted to time domain parameters, wherein the parameters comprise first symbols in a time domain, a periodicity, a number of ports, a time domain CDM (TD-CDM), or some combination thereof. In certain embodiments, the method 1600 further comprises receiving a unified CSI-RS resource mapping for CP-OFDM, SC, SC-FDE, or a combination thereof, and ignoring configured frequency related parameters with a SC waveform, a SC-FDE waveform, or a combination thereof.

In some embodiments, the second configuration information comprises time-domain patterns for positioning reference signal (PRS), PRS time-domain mapping, or a combination thereof. In various embodiments, the method 1600 further comprises receiving a configuration for generating PRS in a time domain to be mapped to consecutive samples in a PRS symbol, a PRS block, or a combination thereof in configured PRS slots, and not expecting to receive frequency related mapping parameters. In one embodiment, the method 1600 further comprises receiving a configuration comprising a time domain offset of the PRS from different cells with an offset calculated based on cell identifiers (IDs) of cells listed for time difference of arrival (TDoA) measurements.

In certain embodiments, the second configuration information comprises time-domain patterns for sounding reference signal (SRS) sequence generation, SRS time-domain mapping, or a combination thereof. In some embodiments, the method 1600 further comprises receiving, from the network device, third configuration information indicating a correspondence between the first reference signal and a second waveform type. In various embodiments, the method 1600 further comprises determining whether to apply the first waveform type or the second waveform type for the first reference signal based on fourth configuration information that indicates a waveform type for transmission, reception, or a combination thereof.

FIG. 17 is a flow chart diagram illustrating another embodiment of a method 1700 for configuring a reference signal corresponding to a waveform type. In some embodiments, the method 1700 is performed by an apparatus, such as the network unit 104. In certain embodiments, the method 1700 may be performed by a processor executing program code, for example, a microcontroller, a microprocessor, a CPU, a GPU, an auxiliary processing unit, a FPGA, or the like.

In various embodiments, the method 1700 includes transmitting 1702, from a network device to a user equipment (UE), first configuration information indicating a first physical channel with a first waveform type. In some embodiments, the method 1700 includes transmitting 1704, to the UE, second configuration information indicating a first reference signal with the first waveform type, wherein, whether a frequency domain multiplexing pattern with combs, frequency domain orthogonal cover code, or a combination thereof is supported is determined for transmission of the first reference signal with the first waveform type.

In certain embodiments, the first waveform type comprises a single carrier waveform. In some embodiments, the second configuration information comprises time-domain patterns for demodulation reference signal (DMRS) sequence generation, DMRS time domain mapping, or a combination thereof. In various embodiments, the method 1700 further comprises transmitting a configuration for generating a DMRS pseudo-random sequence in a time domain to be mapped to consecutive samples in a DMRS symbol, a DMRS block, or a combination thereof.

In one embodiment, the method 1700 further comprises transmitting a DMRS downlink configuration comprising parameters restricted to only time domain parameters, wherein the parameters comprise additional DMRS symbols, a number of ports, a code division multiplexing (CDM) type, or some combination thereof. In certain embodiments, the method 1700 further comprises transmitting a unified DMRS downlink configuration corresponding to cyclic prefix (CP) orthogonal frequency domain multiplexing (OFDM) (CP-OFDM), a single carrier (SC), an SC frequency domain equalizer (FDE) (SC-FDE), or some combination thereof. In some embodiments, the second configuration information comprises time-domain patterns for channel state information reference signal (CSI-RS) sequence generation, CSI-RS time-domain mapping, or a combination thereof.

In various embodiments, the method 1700 further comprises transmitting a configuration for generating a CSI-RS sequence in a time domain to be mapped to consecutive samples in a CSI-RS symbol, a CSI-RS block, or a combination thereof. In one embodiment, the method 1700 further comprises transmitting a CSI-RS resource mapping comprising parameters restricted to time domain parameters, wherein the parameters comprise first symbols in a time domain, a periodicity, a number of ports, a time domain CDM (TD-CDM), or some combination thereof. In certain embodiments, the method 1700 further comprises transmitting a unified CSI-RS resource mapping for CP-OFDM, SC, SC-FDE, or a combination thereof.

In some embodiments, the second configuration information comprises time-domain patterns for positioning reference signal (PRS) sequence generation, PRS time-domain mapping, or a combination thereof. In various embodiments, the method 1700 further comprises transmitting a configuration for generating PRS in a time domain to be mapped to consecutive samples in a PRS symbol, a PRS block, or a combination thereof in configured PRS slots. In one embodiment, the method 1700 further comprises transmitting a configuration comprising a time domain offset of the PRS from different cells with an offset calculated based on cell identifiers (IDs) of cells listed for time difference of arrival (TDoA) measurements.

In certain embodiments, the second configuration information comprises time-domain patterns for sounding reference signal (SRS) sequence generation, SRS time-domain mapping, or a combination thereof. In some embodiments, the method 1700 further comprises transmitting, to the UE, third configuration information indicating a correspondence between the first reference signal and a second waveform type.

In one embodiment, an apparatus comprises a user equipment (UE). The apparatus further comprises: a receiver that: receives, from a network device, first configuration information indicating a first physical channel with a first waveform type; and receives, from a network device, second configuration information indicating a first reference signal with the first waveform type; and a processor that determines whether a frequency domain multiplexing pattern with combs, frequency domain orthogonal cover code, or a combination thereof is supported for transmission of the first reference signal with the first waveform type.

In certain embodiments, the first waveform type comprises a single carrier waveform.

In some embodiments, the second configuration information comprises time-domain patterns for demodulation reference signal (DMRS) sequence generation, DMRS time domain mapping, or a combination thereof.

In various embodiments, the receiver receives a configuration for generating a DMRS pseudo-random sequence in a time domain to be mapped to consecutive samples in a DMRS symbol, a DMRS block, or a combination thereof.

In one embodiment, the receiver receives a DMRS downlink configuration comprising parameters restricted to only time domain parameters, wherein the parameters comprise additional DMRS symbols, a number of ports, a time domain code division multiplexing (TD-CDM) type, or some combination thereof.

In certain embodiments, the receiver receives a unified DMRS downlink configuration corresponding to cyclic prefix (CP) orthogonal frequency domain multiplexing (OFDM) (CP-OFDM), a single carrier (SC), an SC frequency domain equalizer (FDE) (SC-FDE), or some combination thereof, and ignoring configured frequency related parameters with a SC waveform, a SC-FDE waveform, or a combination thereof for DL.

In some embodiments, the second configuration information comprises time-domain patterns for channel state information reference signal (CSI-RS) sequence generation, CSI-RS time-domain mapping, or a combination thereof.

In various embodiments, the receiver receives a configuration for generating a CSI-RS sequence in a time domain to be mapped to consecutive samples in a CSI-RS symbol, a CSI-RS block, or a combination thereof.

In one embodiment, the receiver receives a CSI-RS resource mapping comprising parameters restricted to time domain parameters, wherein the parameters comprise first symbols in a time domain, a periodicity, a number of ports, a time domain CDM (TD-CDM), or some combination thereof.

In certain embodiments, the receiver receives a unified CSI-RS resource mapping for CP-OFDM, SC, SC-FDE, or a combination thereof, and ignoring configured frequency related parameters with a SC waveform, a SC-FDE waveform, or a combination thereof.

In some embodiments, the second configuration information comprises time-domain patterns for positioning reference signal (PRS), PRS time-domain mapping, or a combination thereof.

In various embodiments, the receiver receives a configuration for generating PRS in a time domain to be mapped to consecutive samples in a PRS symbol, a PRS block, or a combination thereof in configured PRS slots, and not expecting to receive frequency related mapping parameters.

In one embodiment, the receiver receives a configuration comprising a time domain offset of the PRS from different cells with an offset calculated based on cell identifiers (IDs) of cells listed for time difference of arrival (TDoA) measurements.

In certain embodiments, the second configuration information comprises time-domain patterns for sounding reference signal (SRS) sequence generation, SRS time-domain mapping, or a combination thereof.

In some embodiments, the receiver receives, from the network device, third configuration information indicating a correspondence between the first reference signal and a second waveform type.

In various embodiments, the processor determines whether to apply the first waveform type or the second waveform type for the first reference signal based on fourth configuration information that indicates a waveform type for transmission, reception, or a combination thereof.

In one embodiment, a method of a user equipment (UE) comprises: receiving, from a network device, first configuration information indicating a first physical channel with a first waveform type; receiving, from a network device, second configuration information indicating a first reference signal with the first waveform type; and determining whether a frequency domain multiplexing pattern with combs, frequency domain orthogonal cover code, or a combination thereof is supported for transmission of the first reference signal with the first waveform type.

In certain embodiments, the first waveform type comprises a single carrier waveform.

In some embodiments, the second configuration information comprises time-domain patterns for demodulation reference signal (DMRS) sequence generation, DMRS time domain mapping, or a combination thereof.

In various embodiments, the method further comprises receiving a configuration for generating a DMRS pseudo-random sequence in a time domain to be mapped to consecutive samples in a DMRS symbol, a DMRS block, or a combination thereof.

In one embodiment, the method further comprises receiving a DMRS downlink configuration comprising parameters restricted to only time domain parameters, wherein the parameters comprise additional DMRS symbols, a number of ports, a time domain code division multiplexing (TD-CDM) type, or some combination thereof.

In certain embodiments, the method further comprises receiving a unified DMRS downlink configuration corresponding to cyclic prefix (CP) orthogonal frequency domain multiplexing (OFDM) (CP-OFDM), a single carrier (SC), an SC frequency domain equalizer (FDE) (SC-FDE), or some combination thereof, and ignoring configured frequency related parameters with a SC waveform, a SC-FDE waveform, or a combination thereof for DL.

In some embodiments, the second configuration information comprises time-domain patterns for channel state information reference signal (CSI-RS) sequence generation, CSI-RS time-domain mapping, or a combination thereof.

In various embodiments, the method further comprises receiving a configuration for generating a CSI-RS sequence in a time domain to be mapped to consecutive samples in a CSI-RS symbol, a CSI-RS block, or a combination thereof.

In one embodiment, the method further comprises receiving a CSI-RS resource mapping comprising parameters restricted to time domain parameters, wherein the parameters comprise first symbols in a time domain, a periodicity, a number of ports, a time domain CDM (TD-CDM), or some combination thereof.

In certain embodiments, the method further comprises receiving a unified CSI-RS resource mapping for CP-OFDM, SC, SC-FDE, or a combination thereof, and ignoring configured frequency related parameters with a SC waveform, a SC-FDE waveform, or a combination thereof.

In some embodiments, the second configuration information comprises time-domain patterns for positioning reference signal (PRS), PRS time-domain mapping, or a combination thereof.

In various embodiments, the method further comprises receiving a configuration for generating PRS in a time domain to be mapped to consecutive samples in a PRS symbol, a PRS block, or a combination thereof in configured PRS slots, and not expecting to receive frequency related mapping parameters.

In one embodiment, the method further comprises receiving a configuration comprising a time domain offset of the PRS from different cells with an offset calculated based on cell identifiers (IDs) of cells listed for time difference of arrival (TDoA) measurements.

In certain embodiments, the second configuration information comprises time-domain patterns for sounding reference signal (SRS) sequence generation, SRS time-domain mapping, or a combination thereof.

In some embodiments, the method further comprises receiving, from the network device, third configuration information indicating a correspondence between the first reference signal and a second waveform type.

In various embodiments, the method further comprises determining whether to apply the first waveform type or the second waveform type for the first reference signal based on fourth configuration information that indicates a waveform type for transmission, reception, or a combination thereof.

In one embodiment, an apparatus comprises a network device. The apparatus further comprises: a transmitter that: transmits, to a user equipment (UE), first configuration information indicating a first physical channel with a first waveform type; and transmits, to the UE, second configuration information indicating a first reference signal with the first waveform type, wherein, whether a frequency domain multiplexing pattern with combs, frequency domain orthogonal cover code, or a combination thereof is supported is determined for transmission of the first reference signal with the first waveform type.

In certain embodiments, the first waveform type comprises a single carrier waveform.

In some embodiments, the second configuration information comprises time-domain patterns for demodulation reference signal (DMRS) sequence generation, DMRS time domain mapping, or a combination thereof.

In various embodiments, the transmitter transmits a configuration for generating a DMRS pseudo-random sequence in a time domain to be mapped to consecutive samples in a DMRS symbol, a DMRS block, or a combination thereof.

In one embodiment, the transmitter transmits a DMRS downlink configuration comprising parameters restricted to only time domain parameters, wherein the parameters comprise additional DMRS symbols, a number of ports, a code division multiplexing (CDM) type, or some combination thereof.

In certain embodiments, the transmitter transmits a unified DMRS downlink configuration corresponding to cyclic prefix (CP) orthogonal frequency domain multiplexing (OFDM) (CP-OFDM), a single carrier (SC), an SC frequency domain equalizer (FDE) (SC-FDE), or some combination thereof.

In some embodiments, the second configuration information comprises time-domain patterns for channel state information reference signal (CSI-RS) sequence generation, CSI-RS time-domain mapping, or a combination thereof.

In various embodiments, the transmitter transmits a configuration for generating a CSI-RS sequence in a time domain to be mapped to consecutive samples in a CSI-RS symbol, a CSI-RS block, or a combination thereof.

In one embodiment, the transmitter transmits a CSI-RS resource mapping comprising parameters restricted to time domain parameters, wherein the parameters comprise first symbols in a time domain, a periodicity, a number of ports, a time domain CDM (TD-CDM), or some combination thereof.

In certain embodiments, the transmitter transmits a unified CSI-RS resource mapping for CP-OFDM, SC, SC-FDE, or a combination thereof.

In some embodiments, the second configuration information comprises time-domain patterns for positioning reference signal (PRS) sequence generation, PRS time-domain mapping, or a combination thereof.

In various embodiments, the transmitter transmits a configuration for generating PRS in a time domain to be mapped to consecutive samples in a PRS symbol, a PRS block, or a combination thereof in configured PRS slots.

In one embodiment, the transmitter transmits a configuration comprising a time domain offset of the PRS from different cells with an offset calculated based on cell identifiers (IDs) of cells listed for time difference of arrival (TDoA) measurements.

In certain embodiments, the second configuration information comprises time-domain patterns for sounding reference signal (SRS) sequence generation, SRS time-domain mapping, or a combination thereof.

In some embodiments, the transmitter transmits, to the UE, third configuration information indicating a correspondence between the first reference signal and a second waveform type.

In one embodiment, a method of a network device comprises: transmitting, to a user equipment (UE), first configuration information indicating a first physical channel with a first waveform type; and transmitting, to the UE, second configuration information indicating a first reference signal with the first waveform type, wherein, whether a frequency domain multiplexing pattern with combs, frequency domain orthogonal cover code, or a combination thereof is supported is determined for transmission of the first reference signal with the first waveform type.

ported is determined for transmission of the first reference signal with the first waveform type.

In certain embodiments, the first waveform type comprises a single carrier waveform.

In some embodiments, the second configuration information comprises time-domain patterns for demodulation reference signal (DMRS) sequence generation, DMRS time domain mapping, or a combination thereof.

In various embodiments, the method further comprises transmitting a configuration for generating a DMRS pseudo-random sequence in a time domain to be mapped to consecutive samples in a DMRS symbol, a DMRS block, or a combination thereof.

In one embodiment, the method further comprises transmitting a DMRS downlink configuration comprising parameters restricted to only time domain parameters, wherein the parameters comprise additional DMRS symbols, a number of ports, a code division multiplexing (CDM) type, or some combination thereof.

In certain embodiments, the method further comprises transmitting a unified DMRS downlink configuration corresponding to cyclic prefix (CP) orthogonal frequency domain multiplexing (OFDM) (CP-OFDM), a single carrier (SC), an SC frequency domain equalizer (FDE) (SC-FDE), or some combination thereof.

In some embodiments, the second configuration information comprises time-domain patterns for channel state information reference signal (CSI-RS) sequence generation, CSI-RS time-domain mapping, or a combination thereof.

In various embodiments, the method further comprises transmitting a configuration for generating a CSI-RS sequence in a time domain to be mapped to consecutive samples in a CSI-RS symbol, a CSI-RS block, or a combination thereof.

In one embodiment, the method further comprises transmitting a CSI-RS resource mapping comprising parameters restricted to time domain parameters, wherein the parameters comprise first symbols in a time domain, a periodicity, a number of ports, a time domain CDM (TD-CDM), or some combination thereof.

In certain embodiments, the method further comprises transmitting a unified CSI-RS resource mapping for CP-OFDM, SC, SC-FDE, or a combination thereof.

In some embodiments, the second configuration information comprises time-domain patterns for positioning reference signal (PRS) sequence generation, PRS time-domain mapping, or a combination thereof.

In various embodiments, the method further comprises transmitting a configuration for generating PRS in a time domain to be mapped to consecutive samples in a PRS symbol, a PRS block, or a combination thereof in configured PRS slots.

In one embodiment, the method further comprises transmitting a configuration comprising a time domain offset of the PRS from different cells with an offset calculated based on cell identifiers (IDs) of cells listed for time difference of arrival (TDoA) measurements.

In certain embodiments, the second configuration information comprises time-domain patterns for sounding reference signal (SRS) sequence generation, SRS time-domain mapping, or a combination thereof.

In some embodiments, the method further comprises transmitting, to the UE, third configuration information indicating a correspondence between the first reference signal and a second waveform type.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
receive, from a network device, first configuration information indicating a first physical channel with a first waveform type, second configuration information indicating a first reference signal with the first waveform type, and third configuration information indicating the first reference signal with a second waveform type; and
determine whether a frequency domain multiplexing pattern with combs, frequency domain orthogonal cover code, or a combination thereof is supported for transmission of the first reference signal with the first waveform type or the second waveform type.

2. The UE of claim 1, wherein the first waveform type comprises a single carrier waveform.

3. The UE of claim 1, wherein the second configuration information comprises time-domain patterns for demodulation reference signal (DMRS) sequence generation, DMRS time domain mapping, or a combination thereof.

4. The UE of claim 3, wherein the at least one processor is configured to cause the UE to receive, as part of the second configuration information, a DMRS downlink configuration comprising parameters restricted to only time domain parameters, wherein the parameters comprise additional DMRS symbols, a number of ports, a time domain code division multiplexing (TD-CDM) type, or a combination thereof.

5. The UE of claim 3, wherein the at least one processor is configured to cause the UE to receive, as part of the second configuration information, a unified DMRS downlink configuration corresponding to cyclic prefix (CP) orthogonal frequency domain multiplexing (OFDM) (CP-OFDM), a single carrier (SC), an SC frequency domain equalizer (FDE) (SC-FDE), or a combination thereof, and ignoring configured frequency related parameters with a SC waveform, a SC-FDE waveform, or a combination thereof for DL.

6. The UE of claim 1, wherein the second configuration information comprises time-domain patterns for channel state information reference signal (CSI-RS) sequence generation, CSI-RS time-domain mapping, or a combination thereof.

7. The UE of claim 6, wherein the at least one processor is configured to cause the UE to receive, as part of the second configuration information, a CSI-RS resource mapping comprising parameters restricted to time domain parameters, wherein the parameters comprise first symbols in a time domain, a periodicity, a number of ports, a time domain CDM (TD-CDM), or a combination thereof.

8. The UE of claim 6, wherein the at least one processor is configured to cause the UE to receive, as part of the second configuration information, a unified CSI-RS resource mapping for CP-OFDM, SC, SC-FDE, or a combination thereof, and ignoring configured frequency related parameters with a SC waveform, a SC-FDE waveform, or a combination thereof.

9. The UE of claim 1, wherein the second configuration information comprises time-domain patterns for positioning reference signal (PRS), PRS time-domain mapping, or a combination thereof.

10. The UE of claim 9, wherein the at least one processor is configured to cause the UE to receive, as part of the second configuration information, a configuration comprising a time domain offset of the PRS from different cells with an offset calculated based on cell identifiers (IDs) of cells listed for time difference of arrival (TDoA) measurements.

11. The UE of claim 1, wherein the second configuration information comprises time-domain patterns for sounding reference signal (SRS) sequence generation, SRS time-domain mapping, or a combination thereof.

12. The UE of claim 1, wherein the at least one processor is configured to cause the UE to determine whether to apply the first waveform type or the second waveform type for the first reference signal based on fourth configuration information that indicates a waveform type for transmission, reception, or a combination thereof.

13. A processor for wireless communication, comprising:
at least one controller coupled with at least one memory and configured to cause the processor to:
receive, from a network device, first configuration information indicating a first physical channel with a first waveform type, second configuration information indicating a first reference signal with the first waveform type, and third configuration information indicating the first reference signal with a second waveform type; and
determine whether a frequency domain multiplexing pattern with combs, frequency domain orthogonal cover code, or a combination thereof is supported for transmission of the first reference signal with the first waveform type or the second waveform type.

14. The processor of claim 13, wherein the first waveform type comprises a single carrier waveform.

15. The processor of claim 13, wherein the second configuration information comprises time-domain patterns for demodulation reference signal (DMRS) sequence generation, DMRS time domain mapping, or a combination thereof.

16. The processor of claim 15, wherein the at least one controller is configured to cause the processor to receive a DMRS downlink configuration comprising parameters restricted to only time domain parameters, wherein the parameters comprise additional DMRS symbols, a number of ports, a time domain code division multiplexing (TD-CDM) type, or a combination thereof.

17. The processor of claim 15, wherein the at least one controller is configured to cause the processor to receive a unified DMRS downlink configuration corresponding to cyclic prefix (CP) orthogonal frequency domain multiplexing (OFDM) (CP-OFDM), a single carrier (SC), an SC frequency domain equalizer (FDE) (SC-FDE), or a combination thereof, and ignoring configured frequency related parameters with a SC waveform, a SC-FDE waveform, or a combination thereof for DL.

18. An apparatus for performing a network function, the apparatus comprising:
at least one memory; and
at least one processor coupled with the at least one memory and configured to cause the apparatus to:
transmit, to a user equipment (UE), first configuration information indicating a first physical channel with a first waveform type, second configuration information indicating a first reference signal with the first waveform type, and third configuration information indicating the first reference signal with a second waveform type, wherein, whether a frequency domain multiplexing pattern with combs, frequency domain orthogonal cover code, or a combination thereof is supported is determined for transmission of the first reference signal with the first waveform type or the second waveform type.

19. A method performed by a user equipment (UE), the method comprising:

receiving, from a network device, first configuration information indicating a first physical channel with a first waveform type, second configuration information indicating a first reference signal with the first waveform type, and third configuration information indicating the first reference signal with a second waveform type; and determining whether a frequency domain multiplexing pattern with combs, frequency domain orthogonal cover code, or a combination thereof is supported for transmission of the first reference signal with the first waveform type or the second waveform type.

\* \* \* \* \*